(12) United States Patent
Nishio

(10) Patent No.: US 10,891,604 B2
(45) Date of Patent: Jan. 12, 2021

(54) CHECKOUT SYSTEM, CHECKOUT DEVICE, CHECKOUT METHOD, AND PROGRAM

(71) Applicant: NEC Corporation, Tokyo (JP)

(72) Inventor: Jun Nishio, Tokyo (JP)

(73) Assignee: NEC CORPORATION, Tokyo (JP)

(*) Notice: Subject to any disclaimer, the term of this patent is extended or adjusted under 35 U.S.C. 154(b) by 368 days.

(21) Appl. No.: 15/763,524

(22) PCT Filed: Sep. 15, 2016

(86) PCT No.: PCT/JP2016/004206
§ 371 (c)(1),
(2) Date: Mar. 27, 2018

(87) PCT Pub. No.: WO2017/056432
PCT Pub. Date: Apr. 6, 2017

(65) Prior Publication Data
US 2018/0276637 A1    Sep. 27, 2018

(30) Foreign Application Priority Data
Sep. 30, 2015 (JP) ................................ 2015-195127

(51) Int. Cl.
G06Q 20/20 (2012.01)
G07G 1/00 (2006.01)
G07G 1/12 (2006.01)

(52) U.S. Cl.
CPC .......... *G06Q 20/208* (2013.01); *G07G 1/00* (2013.01); *G07G 1/0054* (2013.01); *G07G 1/12* (2013.01)

(58) Field of Classification Search
USPC ....................................................... 705/23
See application file for complete search history.

(56) References Cited

U.S. PATENT DOCUMENTS 5,115,888 A * 5/1992 Schneider ............... A47F 9/048
186/61
2003/0047387 A1 3/2003 Bogat
(Continued)

FOREIGN PATENT DOCUMENTS

EP 0650149 A2 4/1995
JP H06-020156 A 1/1994
(Continued)

OTHER PUBLICATIONS

International Search Report for PCT Application No. PCT/JP2016/004206, dated Dec. 20, 2016.
(Continued)

*Primary Examiner* — Garcia Ade

(57) ABSTRACT

The present invention addresses the problem of preventing products from being carried outside a store without complete a checkout process in a checkout system in which a product, a shopping basket in which the product is accommodated, or a shopping cart in which the product is accommodated is disposed in a checkout device when performing a checkout process. In order to solve the problem, a product registration device (10) registers the product. The checkout device (20) performs the checkout process for the product registered by the product registration device (10). An output unit (320) outputs information indicating that a target object (30) (in the example shown in the drawing, a shopping cart (32) in which a product is accommodated) has moved from the checkout device (20) on the basis of the presence or absence of movement of the target object (30) from the checkout device (20), and the state of the checkout process.

16 Claims, 24 Drawing Sheets

(56) References Cited

U.S. PATENT DOCUMENTS

| | | | |
|---|---|---|---|
| 2005/0184147 A1 | 8/2005 | White | |
| 2006/0109135 A1* | 5/2006 | Donat | G08B 21/0288 |
| | | | 340/686.6 |
| 2009/0288917 A1* | 11/2009 | Sato | A47F 9/045 |
| | | | 186/62 |
| 2015/0242833 A1* | 8/2015 | Itani | G07G 1/01 |
| | | | 705/23 |
| 2017/0329510 A1* | 11/2017 | Gorlich | G06F 3/04847 |

FOREIGN PATENT DOCUMENTS

| | | |
|---|---|---|
| JP | H09-120484 A | 5/1997 |
| JP | 2004-086728 A | 3/2004 |
| JP | 2004-171240 A | 6/2004 |
| JP | 2004-361997 A | 12/2004 |
| JP | 2005-258943 A | 9/2005 |
| JP | 2009-282792 A | 12/2009 |
| JP | 2010-191938 A | 9/2010 |
| JP | 2012-084115 A | 4/2012 |
| JP | 2013-218437 A | 10/2013 |
| JP | 2014-002644 A | 1/2014 |
| JP | 2015-049856 A | 3/2015 |
| JP | 2015-133103 A | 7/2015 |
| JP | 2015-143955 A | 8/2015 |

OTHER PUBLICATIONS

English translation of Written opinion for PCT Application No. PCT/JP2016/004206.
Extended European Search Report for EP Application No. EP16850613.7 dated Jun. 3, 2019.

* cited by examiner

CHECKOUT IS STARTED
PLEASE PAY FOR PRODUCT

BILL: ¥12,345
INPUT AMOUNT: ¥0
CHANGE: —

(b)

270(20)

CHECKOUT IS COMPLETED
PLEASE TAKE YOUR CHANGE

BILL: ¥12,345
INPUT AMOUNT: ¥13,000
CHANGE: ¥655

Fig.24
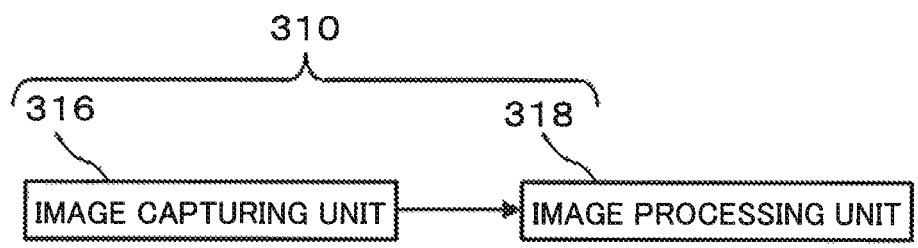
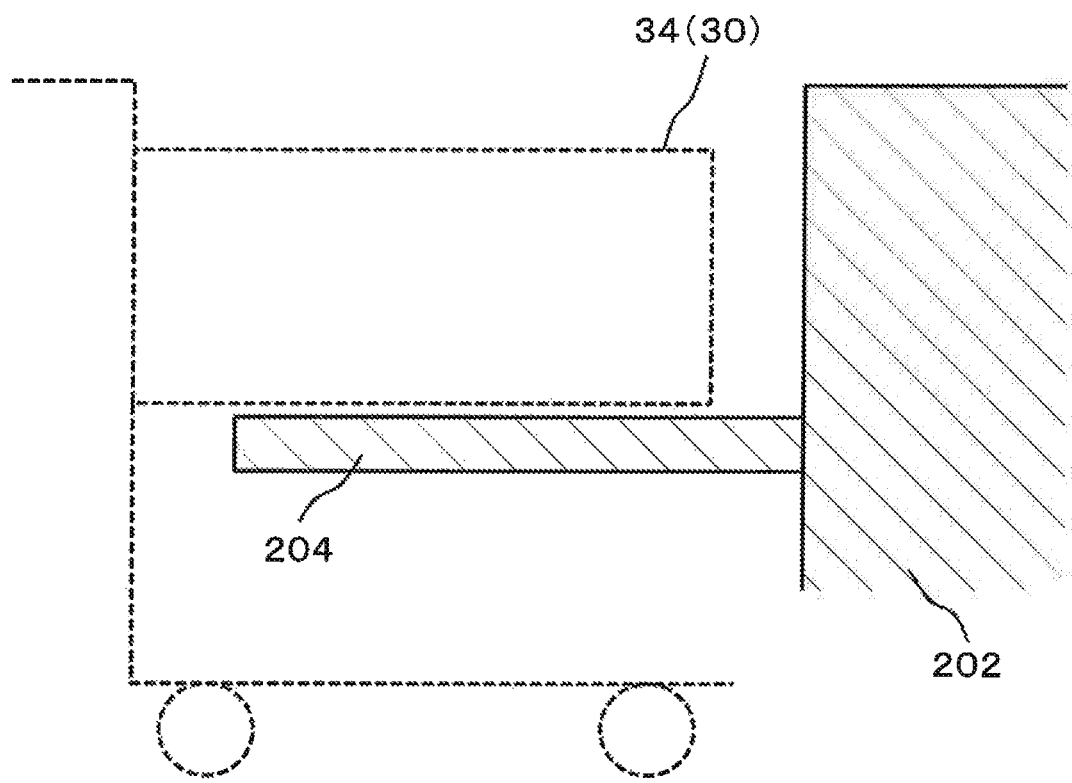

CHECKOUT SYSTEM, CHECKOUT DEVICE, CHECKOUT METHOD, AND PROGRAM

This application is a National Stage Entry of PCT/JP2016/004206 filed on Sep. 15, 2016, which claims priority from Japanese Patent Application 2015-195127 filed on Sep. 30, 2015, the contents of all of which are incorporated herein by reference, in their entirety.

TECHNICAL FIELD

The present invention relates to a checkout system, a checkout device, a checkout method, and a program.

BACKGROUND ART

In a retail store such as a supermarket, a customer sometimes uses a checkout system to conduct a checkout process. PTL 1 discloses one example of such checkout system. In the checkout system disclosed in PTL 1, a product registration device and a checkout device are provided at mutually different positions. Further, in this checkout system, a sales assistant registers a product using the product registration device and a customer conducts the checkout process using the checkout device.

PTL 2 discloses an illegality monitoring system for monitoring an abnormal takeout of display products based on captured images. The system, when the customer takes out the product from a display position, assumes the product as a product to be monitored and associates the product to be monitored with a customer image. Then, the system, from among the products to be monitored associated with the customer image, sets a product whose checkout is finished as an unmonitored product. The system, upon the completion of the checkout of one transaction, when the product to be monitored, i.e., still the target to be monitored is present, informs the possibility of the abnormal takeout.

PTL 3 discloses a use of a copy machine for a product registration device and a checkout device.

The copy machine includes a first tray and a second tray. To each of the first tray and the second tray, a weight sensor is provided. The customer places the product on the first tray. The product is, after being registered, placed on the second tray. In this case, by comparing a weight detected at the first tray before the registration of the product with a weight detected at the second tray after the registration of the product, whether all products placed on the first tray are registered is determined.

PTL 4 discloses one example of a checkout counter. This checkout counter includes a mounting unit that can move in a height direction. When the shopping cart mounted with the shopping basket approaches the mounting unit, the mounting unit moves the shopping basket to a height in which the shopping basket can be easily moved from the shopping cart to the mounting unit.

CITATION LIST

Patent Literature

[PTL 1] Japanese Unexamined Patent Publication (Kokai) No. 2013-218437
[PTL 2] Japanese Unexamined Patent Publication (Kokai) No. 2004-171240
[PTL 3] Japanese Unexamined Patent Publication (Kokai) No. 2015-49856
[PTL 4] Japanese Unexamined Patent Publication (Kokai) No. 2009-282792

SUMMARY OF INVENTION

Technical Problem

As disclosed in PTL 1, in some checkout systems, the product registration device and the checkout device are sometimes provided at mutually different positions. In such a checkout system, when the checkout process is conducted using the checkout device, the customer disposes, to the checkout device, the product, the shopping basket in which the product is accommodated, or the shopping cart in which the product is accommodated. In such a checkout system, there is a case where a customer takes out the product outside the store without completing the checkout process.

An object of the present invention is to prevent the product from being carried to the outside of the store without completing the checkout process in the checkout system in which when the checkout process is conducted, to the checkout device, the product, the shopping basket in which the product is accommodated, or the shopping cart in which the product is accommodated is disposed.

Solution to Problem

The present invention disclosed in this description includes a checkout system comprising, a product registration device that registers a product, a checkout device that conducts a checkout process of a product registered through the product registration device, and output means for outputting information indicating that a target object moves from the checkout device based on a state of the checkout process and a presence or an absence of a movement, from the checkout device, the target object being any one of the product, a shopping basket in which the product is accommodated, and a shopping cart in which the product is accommodated.

The present invention disclosed in this description includes a checkout device, comprising, checkout process means for conducting a checkout process of a product that is registered through a product registration device; and output means for outputting information indicating that a target object moves from the checkout device based on a state of the checkout process and a presence or an absence of a movement, from the checkout device, the target object being any one of the product, a shopping basket in which the product is accommodated, and a shopping cart in which the product is accommodated.

The present invention disclosed in this description includes a checkout method comprising, conducting a checkout process of a product that is registered through a product registration device; and outputting information indicating that a target object moves from a checkout device based on a state of the checkout process and a presence or an absence of a movement, from the checkout device, the target object being any one of the product, a shopping basket in which the product is accommodated, and a shopping cart in which the product is accommodated.

The present invention disclosed in this description includes a program that causes a computer to function as a checkout device, the program causing the computer to implement, a function of conducting a checkout process of a product that is registered through a product registration device, and a function of outputting information indicating that a target object moves from the checkout device based on a state of the checkout process and a presence or an absence of a movement, from the checkout device, the target object being any one of the product, a shopping basket in which the product is accommodated, and a shopping cart in which the product is accommodated.

Advantageous Effects of Invention

According to the present invention, it is possible to prevent the product from being carried to the outside of the store without completing the checkout process in the checkout system in which when the checkout process is conducted, to the checkout device, the product, the shopping basket in which the product is accommodated, or the shopping cart in which the product is accommodated is disposed.

BRIEF DESCRIPTION OF DRAWINGS

FIG. 4 is a drawing illustrating one example of an image displayed by a display device of the checkout device.

FIG. 24 is a drawing illustrating the second example of the detail of the configuration of the detection unit used for the checkout system illustrated in FIG. 22.

EXAMPLE EMBODIMENTS

Figure 1:
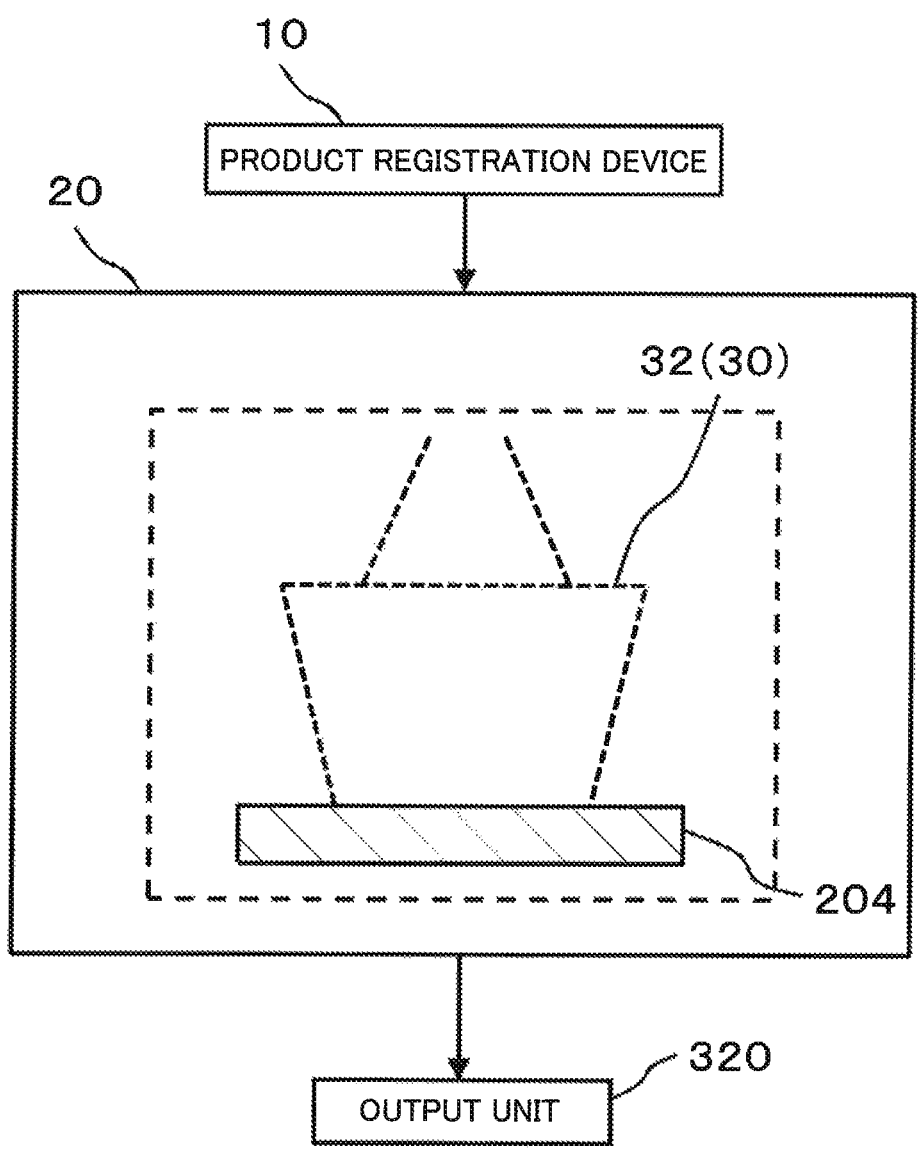
FIG. 1 is a drawing illustrating a configuration of a checkout system according to a first example embodiment.

Example embodiments of the present invention are described below with reference to the drawings. Note that in all drawings, like components are denoted with like reference numerals and descriptions are appropriately omitted.

Note that in the following descriptions, a checkout process unit 290 and a control unit 330 represent blocks of functional units instead of configurations of hardware units. The checkout process unit 290 and the control unit 330 are implemented by any combinations of the hardware and the software based on the CPU of any computer, the memory, a program for implementing components that are illustrated in the drawings of the present application and loaded to the memory, the storage media such as a hard disk for storing the program, and the interface for network connection. The implementation methods and the devices thereof include various variations.

FIG. 1 is a drawing illustrating a configuration of the checkout system according to the example embodiment. The checkout system includes a product registration device 10, a checkout device 20, and an output unit 320 (output means). The product registration device 10 registers the product. The checkout device 20 conducts the checkout process of the product registered at the product registration device 10. The output unit 320 outputs information representing that a target object 30 moves from the checkout device 20 based on the presence or the absence of the movement of the target object 30 (in an example illustrated in FIG. 1, shopping basket 32 in which the product is accommodated) from the checkout device 20 and the state of the checkout process. Specifically, for example, when the target object 30 moves from the checkout device 20 before the checkout process is completed, the output unit 320 outputs the information. Details are described below.

The sales assistant registers the product using the product registration device 10. As will be described in detail later with reference to FIG. 2, the product registration device 10 registers the products that are registered during the period from when the information instructing the start of the registration is input to the product registration device 10 to when the information instructing the completion of the registration is input to the product registration device 10. Then, the product registration device 10 generates checkout information of the products that are registered during the above described period and outputs the checkout information to the checkout device 20. The checkout information indicates the checkout information of the registered product, specifically the adjusted amount of the registered product.

The customer conducts the checkout process of the product using the checkout device 20. The checkout device 20 receives the checkout information from the product registration device 10. As will be described in detail with reference to FIG. 3, the checkout device 20, after receiving the checkout information, receives the payment for the product.

Figure 2:
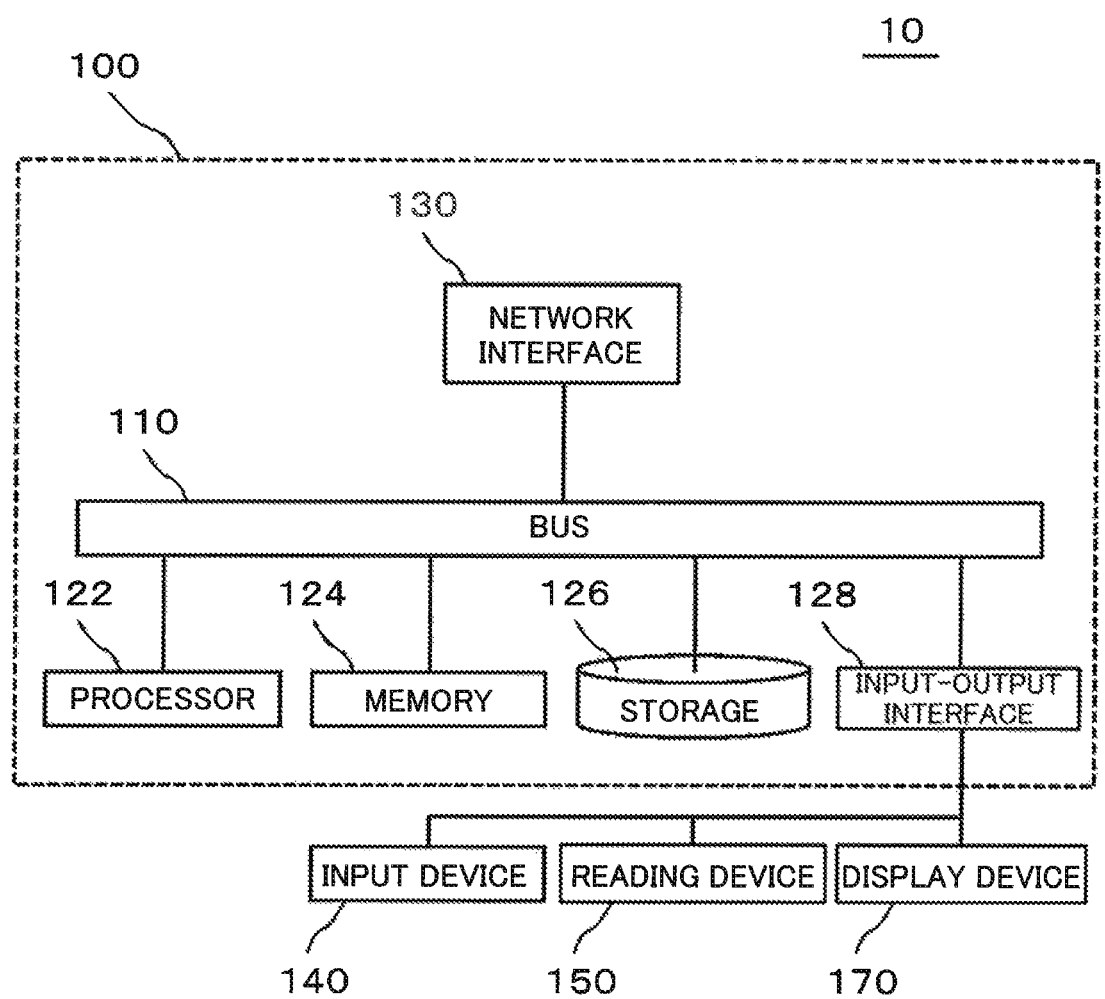
FIG. 2 is a drawing illustrating one example of a hardware configuration of a product registration device.

FIG. 2 is a drawing illustrating one example of the hardware configuration of the product registration device 10. The product registration device 10 includes a calculating machine 100. The calculating machine 100 includes a bus 110, a processor 122, a memory 124, a storage 126, an input-output interface 128, and a network interface 130. Further, the product registration device 10 includes an input device 140, a reading device 150, and a display device 170. In the example illustrated in FIG. 2, the input device 140, the reading device 150, and the display device 170 are provided at the outside of the calculating machine 100.

The processor 122, the memory 124, the storage 126, the input-output interface 128, and the network interface 130 are connected with one another via the bus 110. The processor 122 is an arithmetic processing unit, for example, Central Processing Unit (CPU) or Graphics Processing Unit (GPU). The memory 124 is, for example, Random Access Memory (RAM) or Read Only Memory (ROM). The storage 126 is a storage device, for example, a hard disk, Solid State Drive (SSD), or a memory card. The input-output interface 128 is connected with the reading device 150, the input device 140, and the display device 170. The product registration device 10 is, via the network interface 130, connected with a network interface 230 of the checkout device 20 (described later with reference to FIG. 3).

The sales assistant, via the input device 140 (for example, keyboard or touch panel), inputs the information instructing the start of the registration to the calculating machine 100. Then, the sales assistant, by using the reading device 150, registers the product to the calculating machine 100. The reading device 150 is, for example, a scanner that can read the barcode. When the product is registered, the display device 170 (for example, liquid crystal display) displays information on the registered product. When the registration of the product to be registered is completed, the sales assistant, via the input device 140, inputs the information instructing the completion of the registration to the calculating machine 100. Accordingly, the calculating machine 100 receives information on the product that is registered during the period before the information instructing the completion of the registration is input from when the information instructing the start of the registration is input.

The calculating machine 100 uses information on the product that is registered during the above described period to generate the checkout information. Specifically, the storage 126 stores the program module for generating the checkout information. The processor 122 reads the program module to the memory 124 and then, executes the program module. Note that the processor 122 may execute the above described program module without reading the above described program module to the memory 124.

The checkout information is, via the network interface 130, output to the checkout device 20 (details are described later with reference to FIG. 3).

Figure 3:
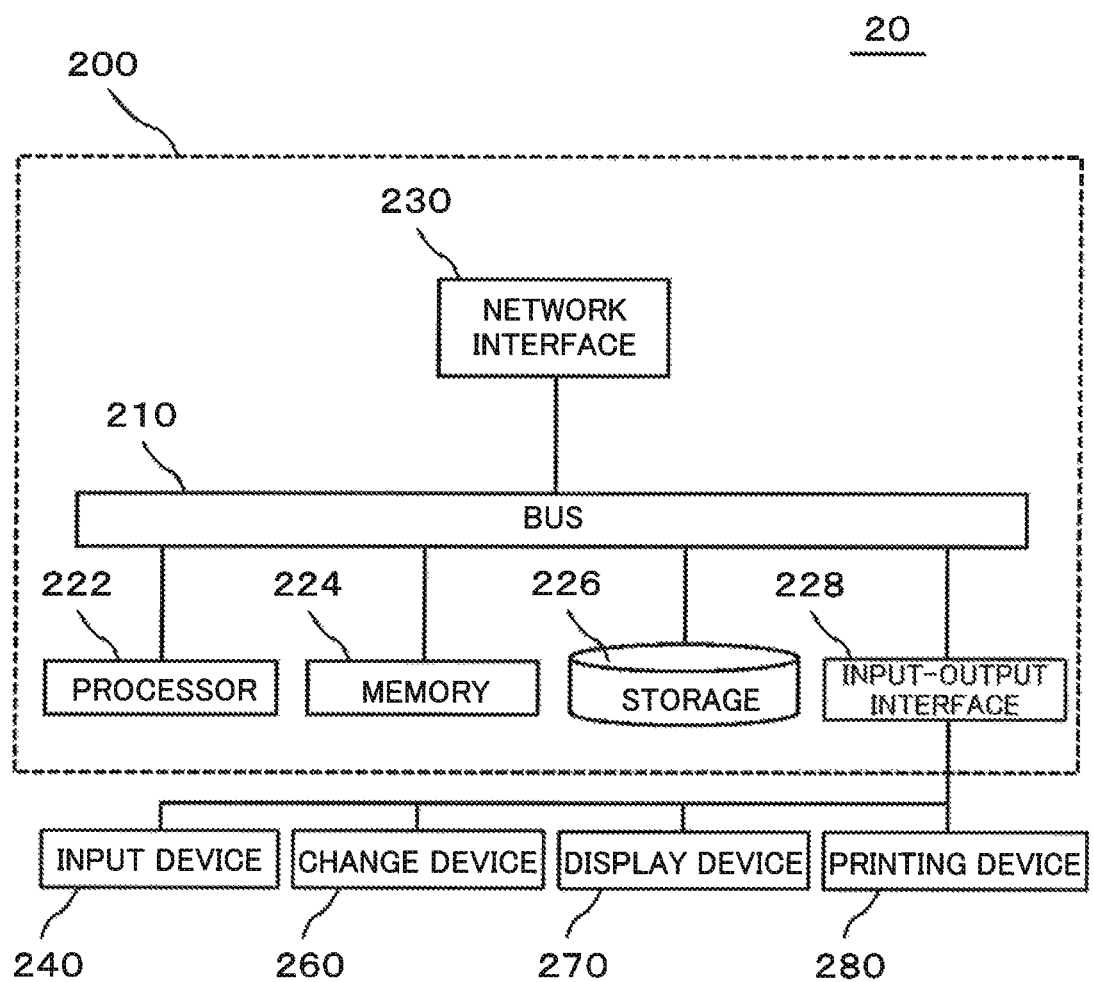
FIG. 3 is a drawing illustrating one example of a hardware configuration of a checkout device.

FIG. 3 is a drawing illustrating one example of the hardware configuration of the checkout device 20. The checkout device 20 includes a calculating machine 200. The calculating machine 200 includes a bus 210, a processor 222, a memory 224, a storage 226, an input-output interface 228, and the network interface 230. Further, the checkout device 20 includes an input device 240, a change device 260, a display device 270, and a printing device 280. In the example illustrated in FIG. 3, the input device 240, the change device 260, the display device 270, and the printing device 280 are provided at the outside of the calculating machine 200.

The processor 222, the memory 224, the storage 226, the input-output interface 228, and the network interface 230 are connected with one another via the bus 210. The processor 222 is the arithmetic processing unit, for example, the CPU or the GPU. The memory 224 is, for example, the RAM or the ROM. The storage 226 is the storage device, for example, the hard disk, the SSD, or the memory card. The input-output interface 228 is connected with the input device 240, the display device 270, the change device 260, and the printing device 280. The checkout device 20 is, via the network interface 230, connected with the network interface 130 of the product registration device 10 (FIG. 2).

When the checkout information is input, the checkout device 20 starts the checkout process. Specifically, when the checkout information is input, the checkout device 20 receives the payment for the product. Note that, as will be described in detail later with reference to FIG. 16, after the checkout information is input, the checkout device 20 may start receiving the payment for the product (i.e., start checkout process) when the target object 30 is disposed to the checkout device 20. The customer, via the input device 240 (for example, keyboard or touch panel), inputs the input signal to the calculating machine 200. Then, the customer pays for the product through the change device 260. The amount of money paid through the change device 260 is displayed on the display device 270 (for example, liquid crystal display). When the adjusted amount indicated by the checkout information is paid through the change device 260, the change device 260 inputs the information instructing the completion of the checkout process to the calculating machine 200. Further, in this case, the printing device 280 (for example, printer) issues the receipt.

The calculating machine 200 calculates the amount of payment entered to the change device 260 after the checkout process is started. Specifically, the storage 226 stores the program module for calculating the amount of payment. The processor 222 reads the program module to the memory 224 and then executes the program module. Note that the processor 222 may execute the above described program module without reading the above described program module to the memory 224.

FIG. 4 is a drawing illustrating one example of an image displayed by the display device 270 of the checkout device 20. In the example illustrated in FIG. 4 (*a*), the checkout device 20 starts the checkout process. The display device 270 displays information indicating that the checkout process is started. In the example illustrated in FIG. 4 (*b*), the checkout device 20 completes the checkout process. The display device 270 displays information indicating that the checkout process is completed.

Figure 5:
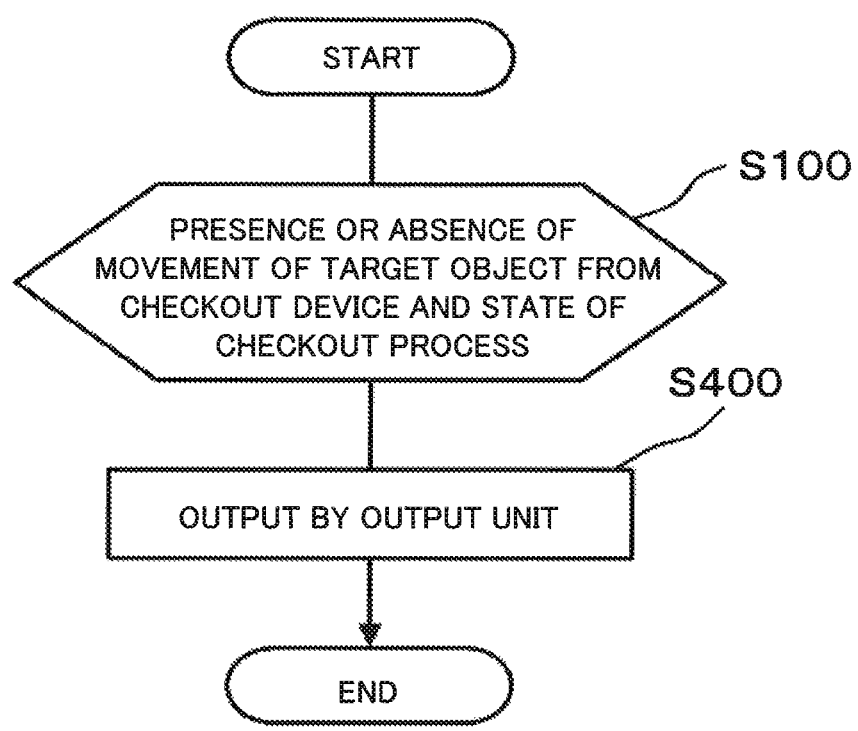
FIG. 5 is a flowchart illustrating one example of an operation conducted by the checkout system illustrated in FIG. 1.

FIG. 5 is a flowchart illustrating one example of the operation conducted by the checkout system illustrated in FIG. 1. As illustrated in FIG. 5, the output unit 320 outputs information indicating that the target object 30 moves from the checkout device 20 (step S400) based on the presence or the absence of the movement of the target object 30 from the checkout device 20 and the state of the checkout process (step S100).

Figure 6:
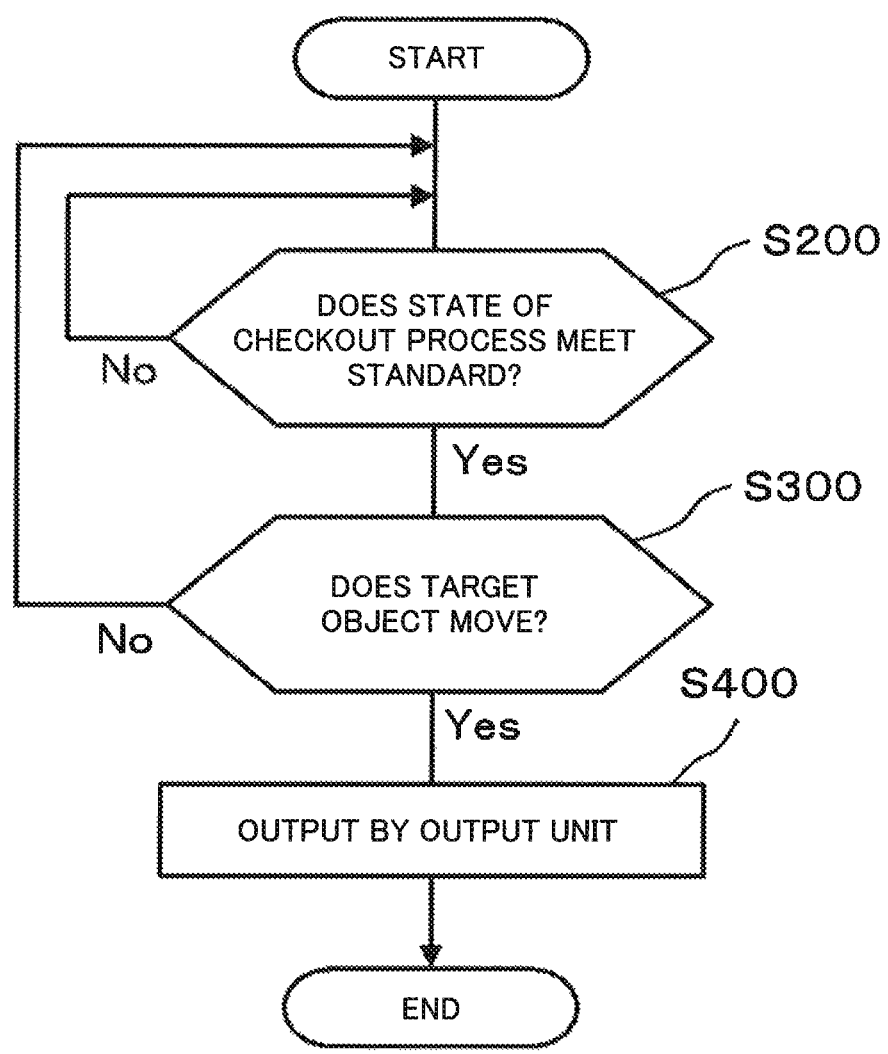
FIG. 6 is a drawing illustrating a variation of FIG. 5.

FIG. 6 is a drawing illustrating a variation of FIG. 5. In the example illustrated in FIG. 6, when the state of the checkout process meets the standard (for example, when the state of the checkout process is the state before the completion of the checkout process) and also when the target object 30 moves from the checkout device 20 (step S200: Yes and step S300: Yes), the output unit 320 outputs the information (step S400).

Figure 7:
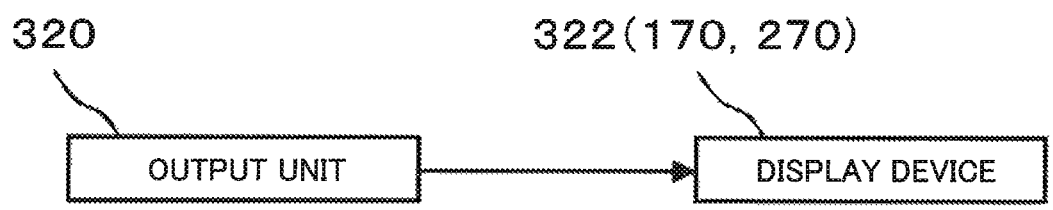
FIG. 7 is a drawing for explaining a first example of the operation of an output unit.

FIG. 7 is a drawing for explaining the first example of the operation of the output unit 320. In the example illustrated in FIG. 7, the output unit 320 outputs the output to a display device 322. When the display device 322 receives the output from the output unit 320, the display device 322 displays information indicating that the target object 30 moves from the checkout device 20. Accordingly, the sales assistant can be informed that the shopping basket 32 (target object 30) moves from the checkout device 20 before the completion of the checkout.

The display device 322 may be, for example, the display device 170 (FIG. 2) of the product registration device 10 or the display device 270 (FIG. 3) of the checkout device 20. Further, the display device 322 may be provided to a position that is distant from both the product registration device 10 and the checkout device 20 and is provided in, for example, the store in which the product registration device 10 and the checkout device 20 are used (more specifically, for example, service counter or back yard). Note that when the display device 322 is the display device 170 of the product registration device 10, the sales assistant can, by confirming the information displayed on the display device 170, be informed that the shopping basket 32 (target object 30) moves from the checkout device 20 before the completion of the checkout without going to the checkout device 20.

Figure 8:
FIG. 8 is a drawing for explaining a second example of the operation of the output unit.

FIG. 8 is a drawing for explaining the second example of the operation of the output unit 320. In the example illustrated in FIG. 8, the output unit 320 outputs the output to a sound wave generating unit 324. When the sound wave generating unit 324 receives the output from the output unit 320, the sound wave generating unit 324 generates the sound wave. Accordingly, the sales assistant can be informed that the shopping basket 32 (target object 30) moves from the checkout device 20 before the completion of the checkout. The sound wave generating unit 324 is, for example, the speaker.

The sound wave generating unit 324 may be provided to the product registration device 10 (FIG. 1) or may be provided to the checkout device 20 (FIG. 1). Further, the sound wave generating unit 324 may be provided to a position that is distant from both the product registration device 10 and the checkout device 20 and is provided in, for example, the store in which the product registration device 10 and the checkout device 20 are used. When the sound wave generating unit 324 is provided to the product registration device 10, the sound wave generating unit 324 may, for example, generate the sound wave only to the circumference of the product registration device 10. When the sound wave generating unit 324 is provided to the checkout device 20, the sound wave generating unit 324 may, for example, generate the sound wave only to the circumference of the checkout device 20. When the sound wave generating unit 324 is provided to a position that is distant from both the product registration device 10 and the checkout device 20, the sound wave generating unit 324 may, for example, generate the sound wave throughout the store.

Figure 9:
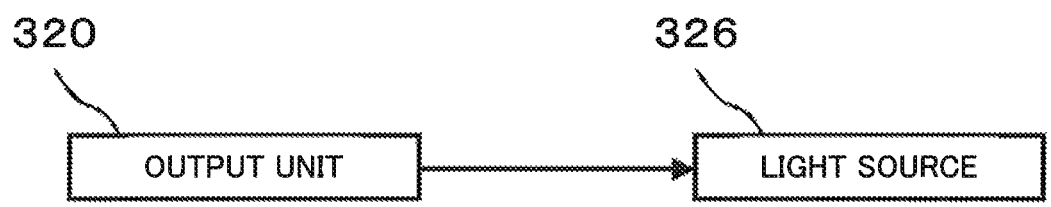
FIG. 9 is a drawing for explaining a third example of the operation of the output unit.

FIG. 9 is a drawing for explaining the third example of the operation of the output unit 320. In the example illustrated in FIG. 9, the output unit 320 outputs the output to a light source 326. When the light source 326 receives the output from the output unit 320, the light source 326 generates the light. Accordingly, the sales assistant can be informed that the shopping basket 32 (target object 30) moves from the checkout device 20 before the completion of the checkout. The light source 326 is, for example, the revolving light.

The light source 326 may be provided to the product registration device 10 (FIG. 1) or may be provided to the checkout device 20 (FIG. 1). Further, the light source 326 may be provided to a position that is distant from both the product registration device 10 and the checkout device 20 and is provided in, for example, the store in which the product registration device 10 and the checkout device 20 are used (more specifically, for example, service counter or back yard).

Figure 10:
FIG. 10 is a drawing for explaining a fourth example of the operation of the output unit.

FIG. 10 is a drawing for explaining the fourth example of the operation of the output unit 320. In the example illustrated in FIG. 10, the output unit 320 outputs the output to a vibration generating unit 328. When the vibration generating unit 328 receives the output from the output unit 320, the vibration generating unit 328 generates the vibration. The vibration generating unit 328 is, for example, a vibrator. The vibration generating unit 328 is held by the sales assistant of the store in which the product registration device 10 (FIG. 1) and the checkout device 20 (FIG. 1) are used. Through the vibration of the vibration generating unit 328, the sales assistant can be informed that the shopping basket 32 (target object 30) moves from the checkout device 20 before the completion of the checkout.

Figure 11:
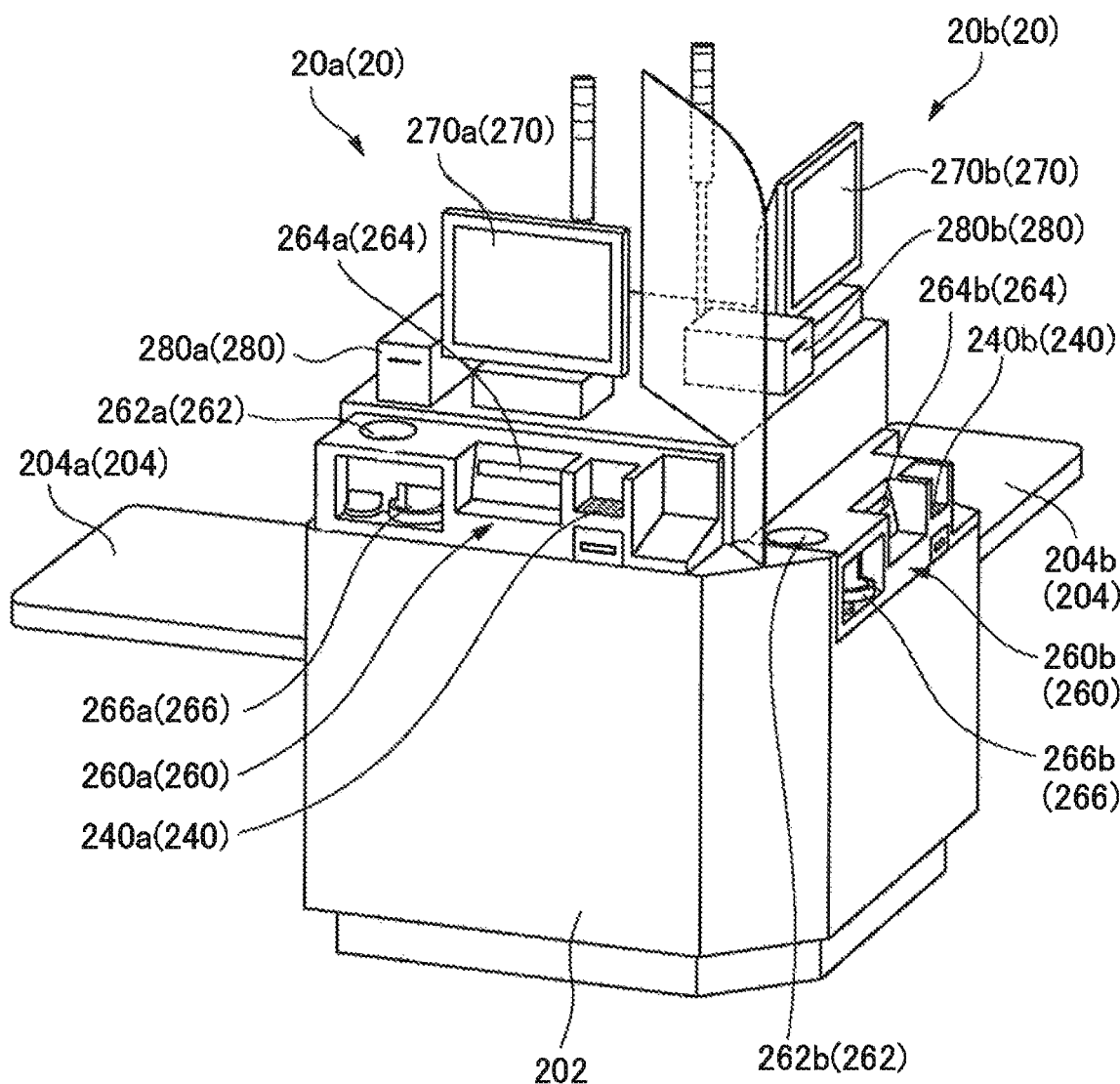
FIG. 11 is a perspective view illustrating one example of a configuration of the checkout device.

FIG. 11 is a perspective view illustrating one example of the configuration of the checkout device 20. In the example illustrated in FIG. 11, two checkout devices 20 (a first checkout device 20a and a second checkout device 20b) are formed using the same base substance 202. The first checkout device 20a and the second checkout device 20b face different directions. Specifically, in the example illustrated in this drawing, an angle formed between a direction in which the first checkout device 20a faces and a direction in which the second checkout device 20b faces is 90 degrees.

Each of the first checkout device 20a and the second checkout device 20b includes the input device 240 (input devices 240a, 240b), the change device 260 (change devices 260a, 260b), the display device 270 (display devices 270a, 270b), and the printing device 280 (printing devices 280a, 280b). The change device 260 includes a coin slot 262, a bill inserting slit 264, and a coin discharge outlet 266. The customer can enter the coin to the coin slot 262 for the payment and enter the bill to the bill inserting slit 264 for the payment. The coin for the change is discharged from the coin discharge outlet 266 and the bill for the change is discharged from the bill inserting slit 264.

To a side face of the base substance 202, a first mounting unit 204a (mounting unit 204) and a second mounting unit 204b (mounting unit 204) are mounted. The customer who uses the first checkout device 20a can dispose, to the first mounting unit 204a, the target object 30 (FIG. 1). The customer who uses the second checkout device 20b can dispose, to the second mounting unit 204b, the target object 30 (FIG. 1).

Figure 12:
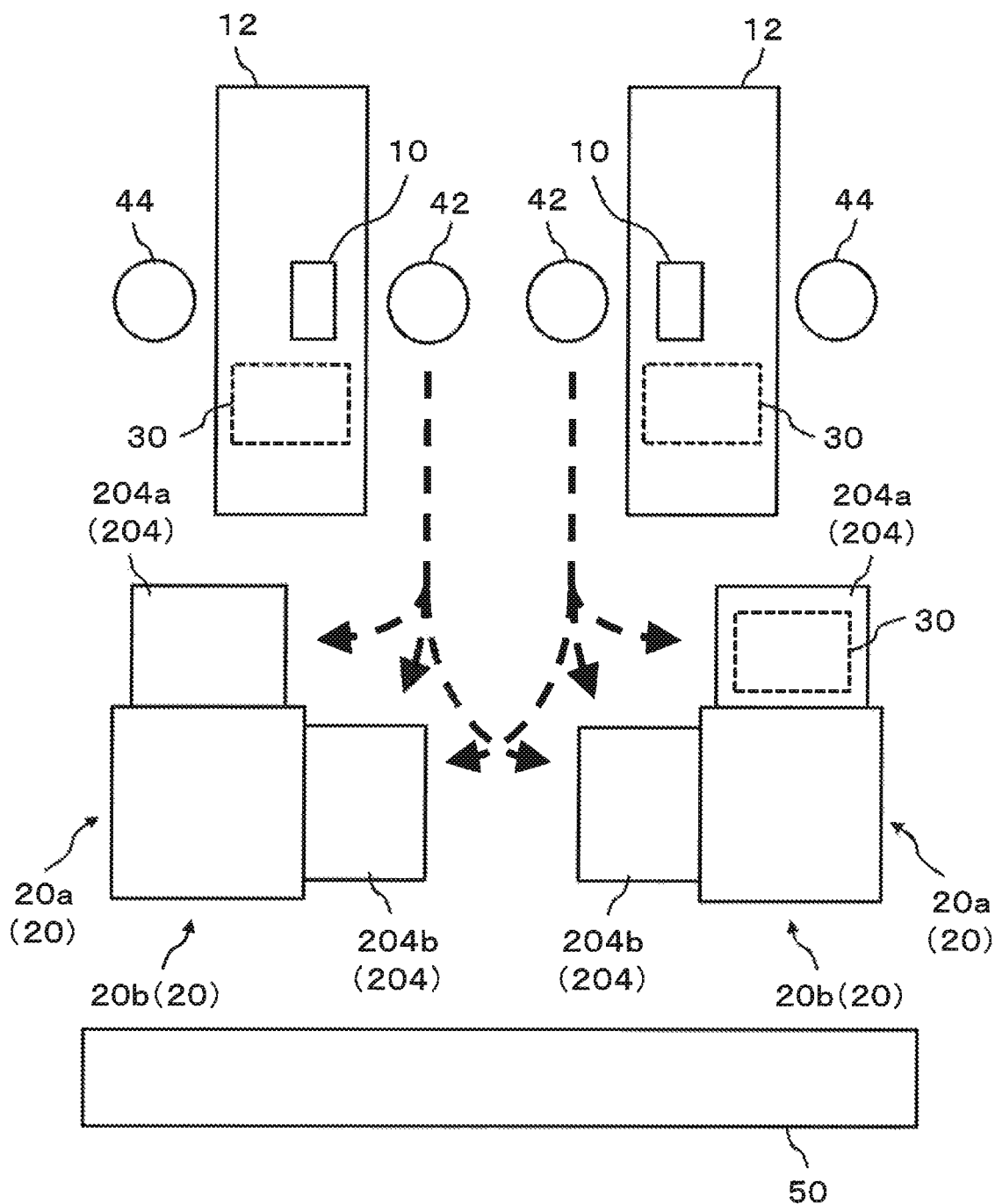
FIG. 12 is a drawing for explaining one example of a use method of a checkout system illustrated in FIG. 1.

FIG. 12 is a drawing for explaining one example of the use method of the checkout system illustrated in FIG. 1. In the example illustrated in FIG. 12, the checkout system is used for the self-payment checkout. In the example illustrated in FIG. 12, a plurality of counters 12 are arranged in parallel with one another. To each of the counters 12, the product registration device 10 is disposed. A sales assistant 42 and a customer 44 face with each other via the counter 12 and the sales assistant 42 registers the product using the product registration device 10.

In the example illustrated in FIG. 12, the checkout device 20 is the checkout device 20 illustrated in FIG. 11. The checkout device 20 is positioned at a place distant from the counter 12. The sales assistant 42, after completing the registration of the product, mounts the target object 30 to the mounting unit 204 of the checkout device 20. Note that the target object 30 may be moved by the customer 44 to the mounting unit 204. Thereafter, the customer 44 moves to the checkout device 20. Then, the customer 44, using the checkout device 20, conducts the checkout process. After completing the checkout process, the customer 44 uses a platform 50 and puts the products in, for example, the plastic bag.

Figure 13:
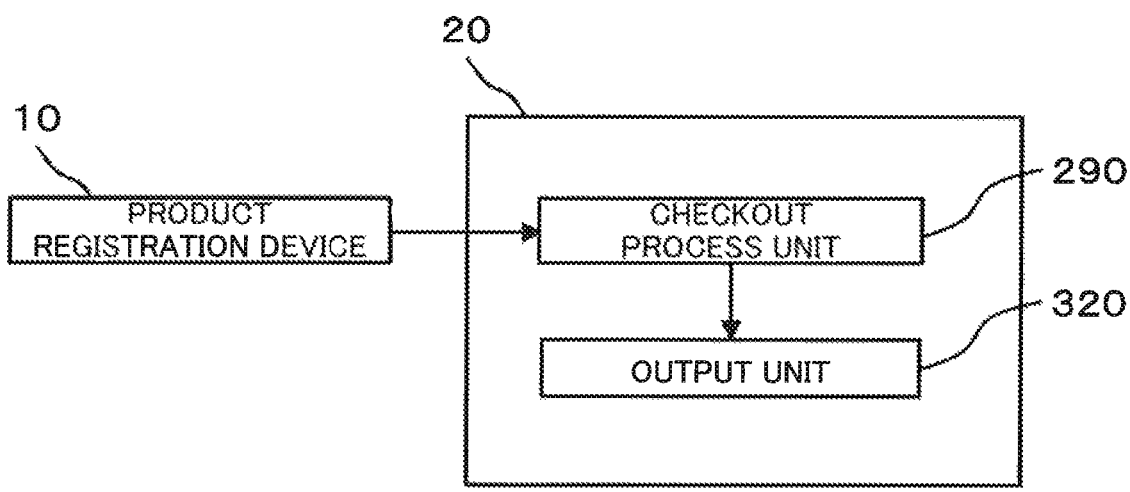
FIG. 13 is a drawing illustrating one example of a configuration of the checkout device.

FIG. 13 is a drawing illustrating one example of the configuration of the checkout device 20. In the example illustrated in this drawing, the checkout device 20 includes the checkout process unit 290 (checkout process means) and the output unit 320. The checkout process unit 290 conducts the checkout process of the product that is registered using the product registration device 10. In the example illustrated in FIG. 13, as similar to the example illustrated in FIG. 1, based on the presence or the absence of the movement of the target object 30 from the checkout device 20 and the state of the checkout process, the output unit outputs information representing that the target object 30 moves from the checkout device 20.

As described above, according to the present example embodiment, based on the presence or the absence of the movement of the target object 30 from the checkout device 20 and the state of the checkout process, the output unit 320 can output information indicating that the target object 30 moves from the checkout device 20. Accordingly, for example, the sales assistant can be informed that the target object 30 moves from the checkout device 20 before the completion of the checkout process.

Second Example Embodiment

Figure 14:
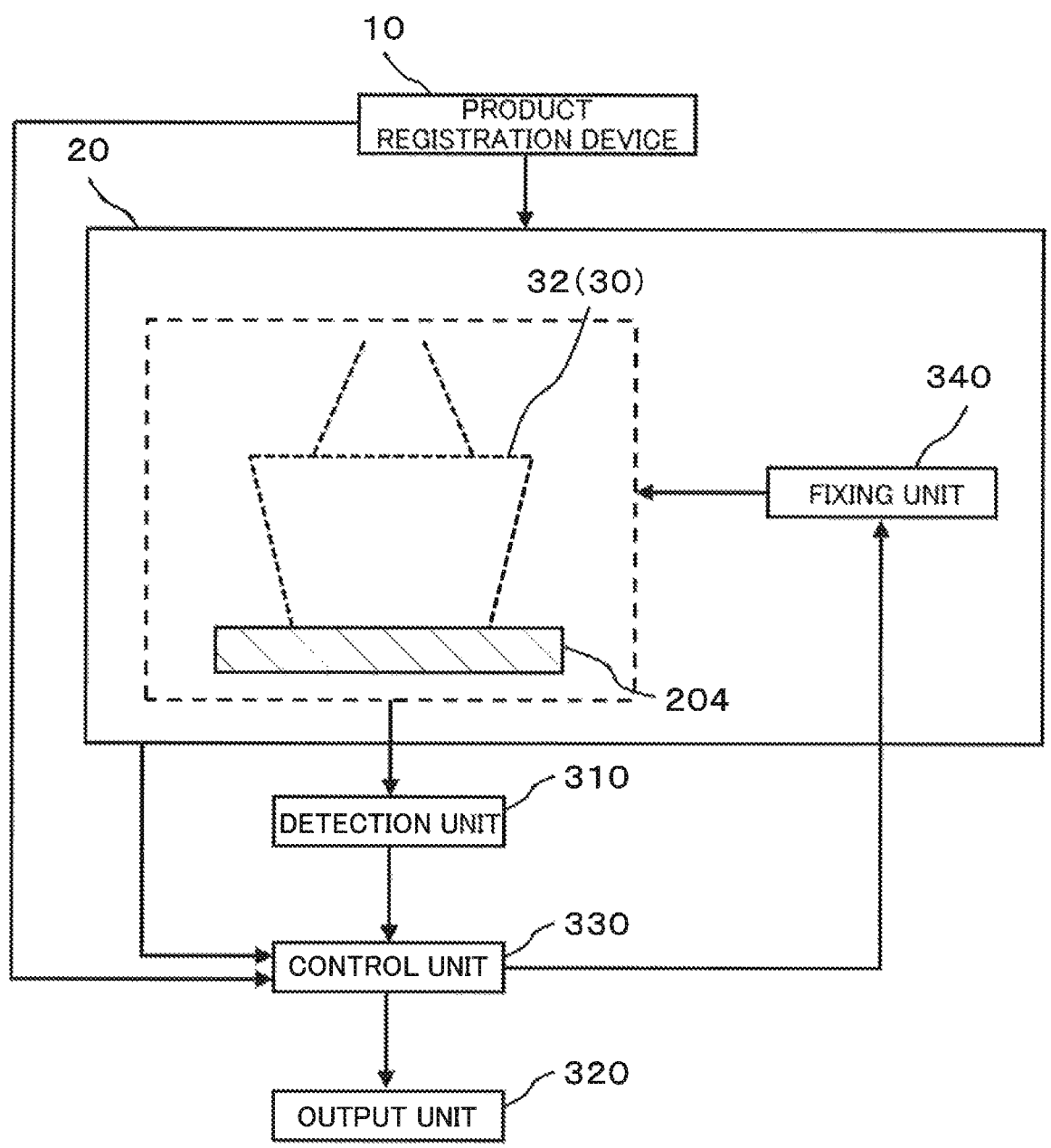
FIG. 14 is a drawing illustrating a configuration of the checkout system according to a second example embodiment.

FIG. 14 is a drawing illustrating a configuration of the checkout system according to the second example embodiment and corresponds to FIG. 1 of the first example embodiment. The checkout system according to the present example embodiment has a configuration similar to that of the checkout system according to the first example embodiment except that the checkout system according to the present example embodiment includes a detection unit 310 (detection means), a control unit 330 (control means), and a fixing unit 340 (fixing means).

The detection unit 310 detects that the shopping basket 32 (target object 30) is mounted to the mounting unit 204 of the checkout device 20 and detects that the shopping basket 32 (target object 30) is away from the mounting unit 204 of the checkout device 20. Note that the detection unit 310 may be attached to the checkout device 20 or may be provided to a position that is distant from the checkout device 20.

The output unit 320 is controlled by the control unit 330. The control unit 330 receives, from the checkout device 20, a state signal, i.e., a signal indicating a state of a checkout process. Further, the control unit 330 receives a detection signal, i.e., a signal indicating a detection result of the detection unit 310. Accordingly, the control unit 330 can determine whether the state of the checkout process meets the standard (for example, whether the state of the checkout process is the state before the completion of the checkout process). When the control unit 330 determines that the state of the checkout process meets the standard, the control unit 330 causes the output unit 320 to output the output.

Figure 15:
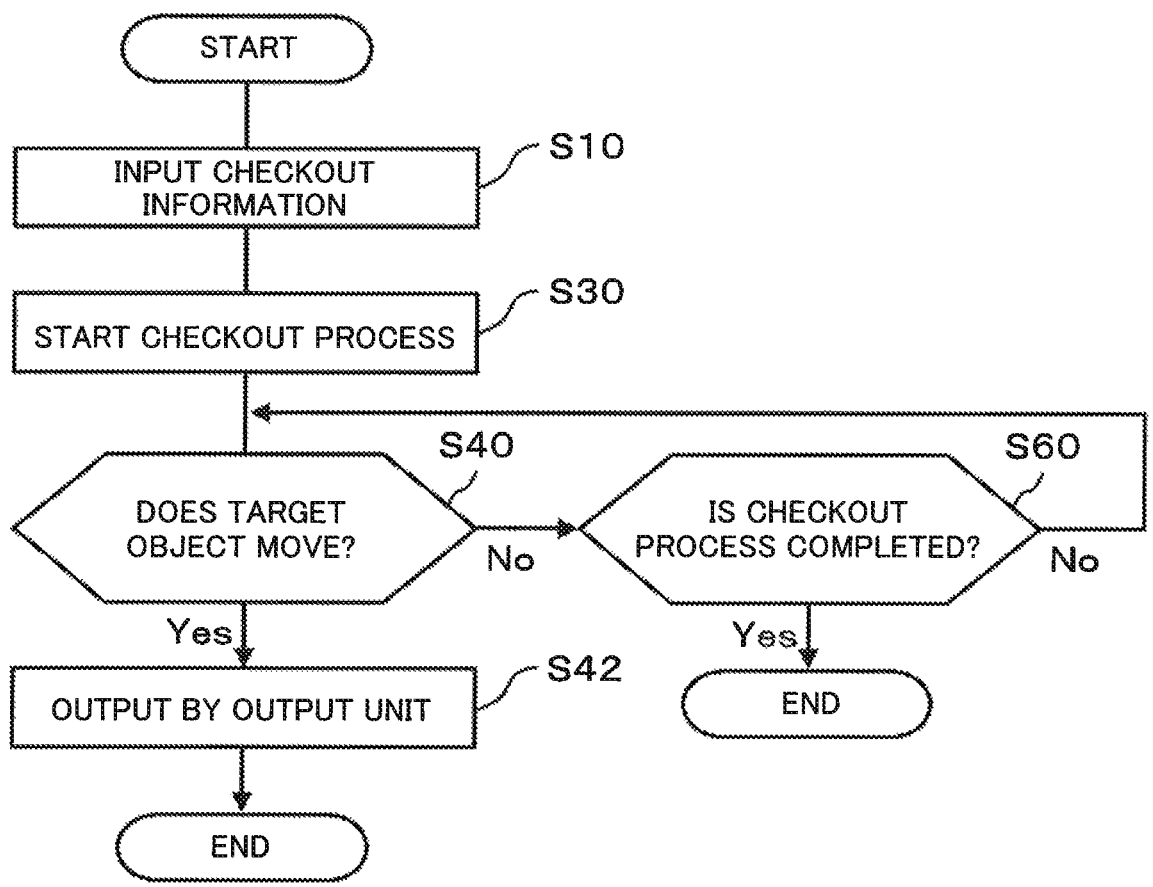
FIG. 15 is a flowchart illustrating the first example of the operation of the checkout system according to the example embodiment.

FIG. 15 is the flowchart illustrating the first example of the operation of the checkout system according to the present example embodiment. First, the product registration device 10 inputs, to the checkout device 20, the checkout information (step S10). Then, the checkout device 20 starts the checkout process (step S30). Next, until the checkout process is completed (step S60: Yes), the control unit 330, based on the detection result of the detection unit 310, determines whether the target object 30 moves from the checkout device 20 (step S40).

When the control unit 330 determines that the target object 30 moves from the checkout device 20 (step S40: Yes), the control unit 330 causes the output unit 320 to output the output (step S42).

In the example illustrated in this drawing, the control unit 330 can determine a timing of each of the start of the checkout process and the completion of the checkout process based on the signal from the checkout device 20. Specifically, when the checkout process is started (in the example illustrated in FIG. 3, when the checkout device 20 starts receiving the payment for the product) (step S30), the checkout device 20 transmits the signal indicating that the checkout process is started to the control unit 330. Accordingly, the control unit 330 can determine that the checkout process is started. Further, when the checkout process is completed (in the example illustrated in FIG. 3, when the adjusted amount indicated by the checkout information is paid for the change device 260) (step S60: Yes), the checkout device 20 transmits the signal indicating that the checkout process is completed to the control unit 330. Accordingly, the control unit 330 can determine that the checkout process is completed.

Note that in the example illustrated in this drawing, before the start of the checkout process (step S30), the control unit 330 does not cause the output unit 320 to output the output. Further, when the checkout process is completed (step S60: Yes), the control unit 330 does not cause the output unit 320 to output the output until the next checkout process is started. Accordingly, even if the target object 30 moves from the checkout device 20 during a period that is different from the period from the start of the checkout process to the end of the checkout process, it is possible to prevent the output unit 320 from outputting the output.

Figure 16:
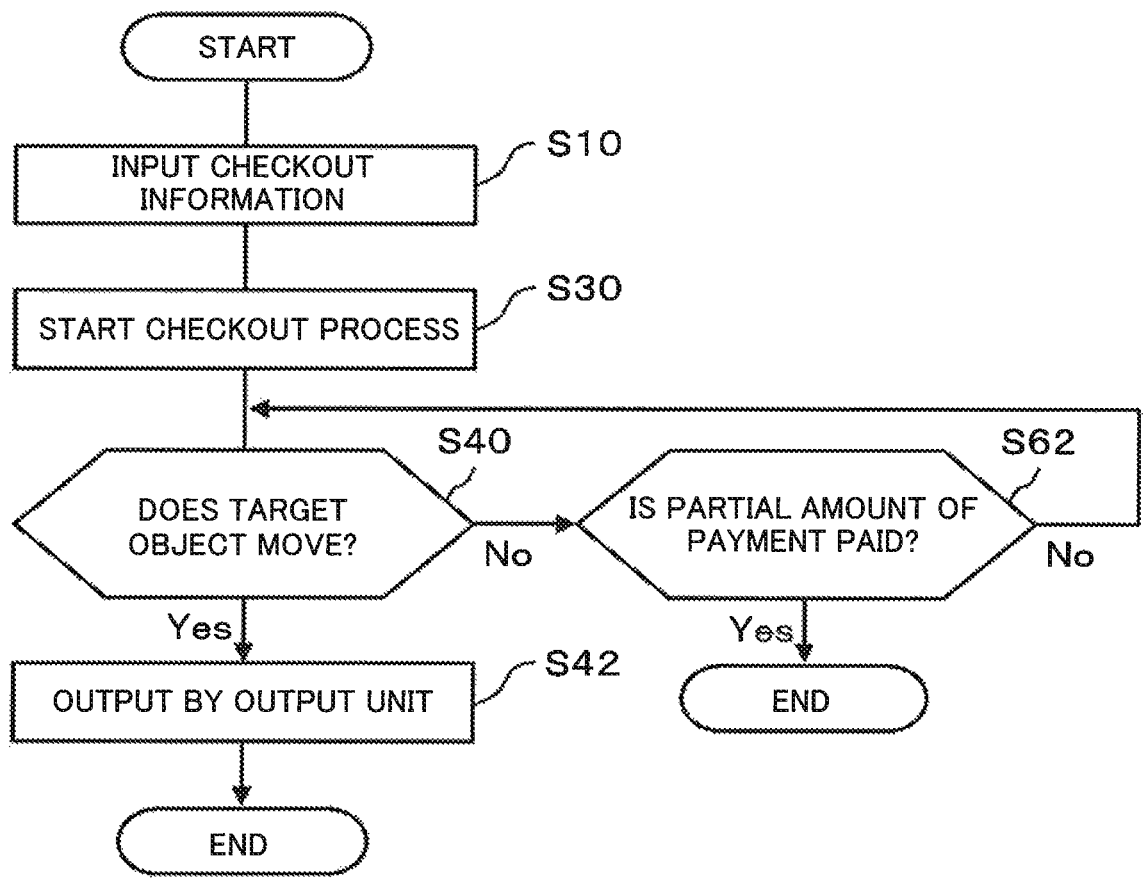
FIG. 16 is a flowchart illustrating the second example of the operation of the checkout system according to the example embodiment.

FIG. 16 is the flowchart illustrating the second example of the operation of the checkout system according to the present example embodiment. In the example illustrated in this drawing, first, as similar to the example illustrated in FIG. 15, the step S10 and the step S30 are conducted. Next, until the partial amount of payment is paid (step S62: Yes), the control unit 330, based on the detection result of the detection unit 310, determines whether the target object 30 moves from the checkout device 20 (step S40). When the control unit 330 determines that the target object 30 moves from the checkout device 20 (step S40: Yes), the control unit 330 causes the output unit 320 to output the output (step S42).

In the example illustrated in this drawing, when the checkout process is not completed (in other words, when the entire amount of payment is not paid for the checkout device 20), even if the target object 30 moves from the checkout device 20, the control unit 330 does not cause the output unit 320 to output the output. Some customers may move the target object 30 from the checkout device 20, before the entire amount of payment is paid for the checkout device 20.

In the example illustrated in this drawing, even if such customer moves the target object 30 from the checkout device 20 after paying the partial amount of payment, it is possible to prevent the output unit 320 from outputting the output.

Figure 17:
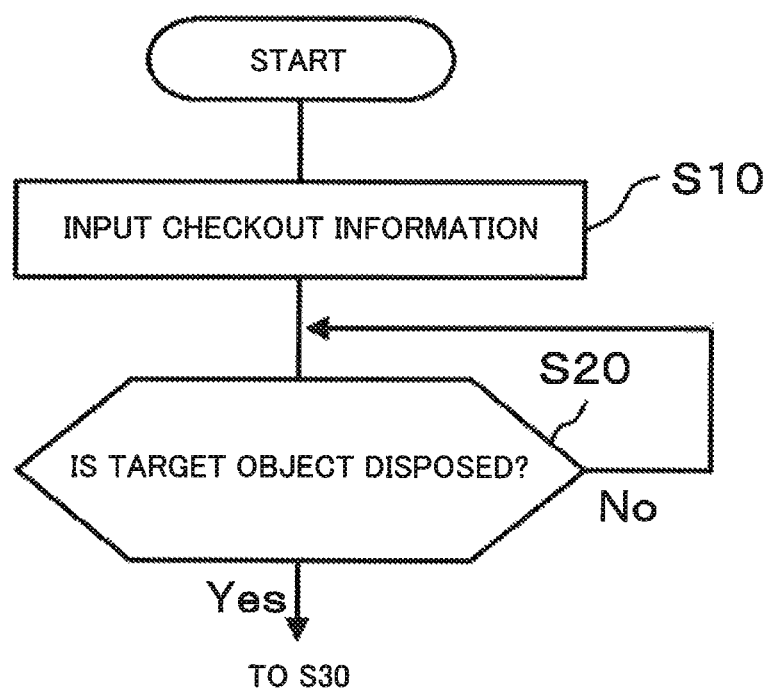
FIG. 17 is a flowchart illustrating the third example of the operation of the checkout system according to the example embodiment.

FIG. 17 is the flowchart illustrating the third example of the operation of the checkout system according to the present example embodiment. First, the product registration device 10 inputs, to the checkout device 20, the checkout information (step S10).

Next, the control unit 330, based on the detection result of the detection unit 310, determines whether the target object 30 is disposed to the checkout device 20 (step S20). When the target object 30 is disposed to the checkout device 20 (step S20: Yes), the checkout device 20 starts the checkout process. Operations thereafter are similar to those in the example illustrated in FIG. 15 or FIG. 16.

Note that in the example illustrated in this drawing, the product registration device 10 may transmit the signal instructing the start of the checkout process to the checkout device 20 based on the input from the sales assistant. Some customers may not dispose the target object 30 to the checkout device 20. When, from the product registration device 10, the above described signal is input to the checkout device 20, such a customer can pay the payment for the product through the checkout device 20.

Further, in the example illustrated in this drawing, during the period from the start of the checkout process (step S30) to the end of the checkout process (step S60, 62: Yes), the target object 30 may be, by the fixing unit 340 (FIG. 340), fixed to the checkout device 20 (mounting unit 204). For example, the fixing unit 340, by physically sandwiching the target object 30, fixes the target object 30 to the mounting unit 204. As illustrated in FIG. 1, the fixing unit 340 is controlled by the control unit 330. The control unit 330, during the period from the start of the checkout process to the end of the checkout process, causes the fixing unit 340 to fix the target object 30.

Figure 18:
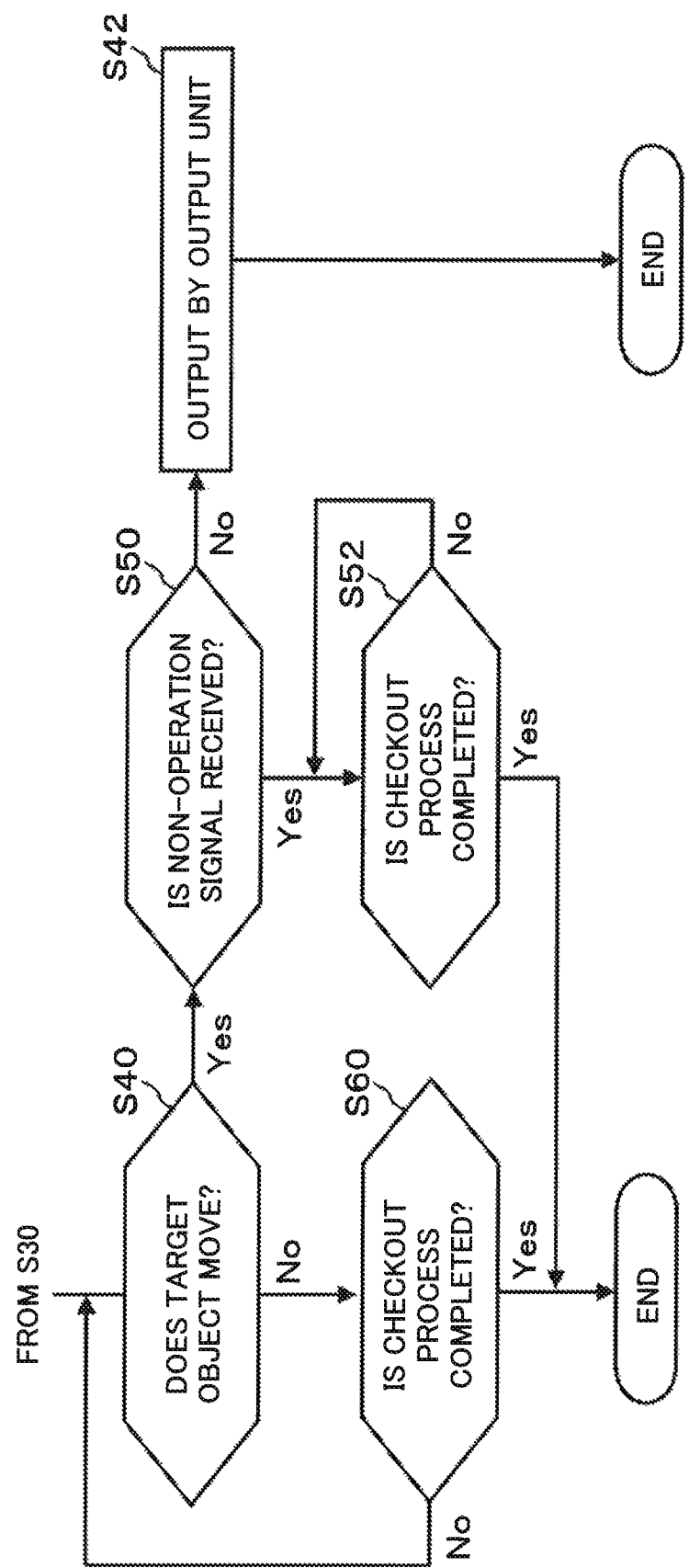
FIG. 18 is a flowchart illustrating the fourth example of the operation of the checkout system according to the example embodiment.

FIG. 18 is the flowchart representing the third example of the operation of the checkout system according to the present example embodiment. Operations illustrated in this drawing are conducted after the step S30. In the example illustrated in this drawing, the product registration device 10 can output a non-operation signal, i.e., a signal for not causing the output unit 320 to output the output. The non-operation signal is output based on, for example, the signal input by the sales assistant via the input device 140 (FIG. 2). When the control unit 330 receives the non-operation signal, the control unit 330 does not cause the output unit 320 to output the output.

In the example illustrated in this drawing, until the checkout process is completed (step S60: Yes), the control unit 330, based on the detection result of the detection unit 310, determines whether the target object 30 moves from the checkout device 20 (step S40). Then, when the control unit 330 determines that the target object 30 moves from the checkout device 20 (step S40: Yes), the control unit 330 determines whether the non-operation signal is received (step S50). When the control unit 330 does not receive the non-operation signal (step S50: No), the control unit 330 causes the output unit 320 to output the output (step S42). On the other hand, when the control unit 330 receives the non-operation signal (step S50: Yes), the control unit 330 does not cause the output unit 320 to output the output until the checkout process is completed (step S52: Yes).

In the example illustrated in this drawing, even if, before the completion of the checkout process, the target object 30 is moved from the checkout device 20, the output unit 320 can be caused not to output the output. Some customers may wish to move the target object 30 from the checkout device 20 before the completion of the checkout process. When the sales assistant receives such request from such customer, the non-operation signal is caused to be output from the product registration device 10. Accordingly, even if, before the completion of the checkout process, the target object 30 is moved from the checkout device 20, the output unit 320 can be caused not to output the output.

Note that the non-operation signal may be output from the checkout device 20. In this case, the non-operation signal is output, based on, for example, the signal input by the sales assistant (or the customer who gets the permission of the sales assistant) via the input device 240 (FIG. 3).

Figure 19:
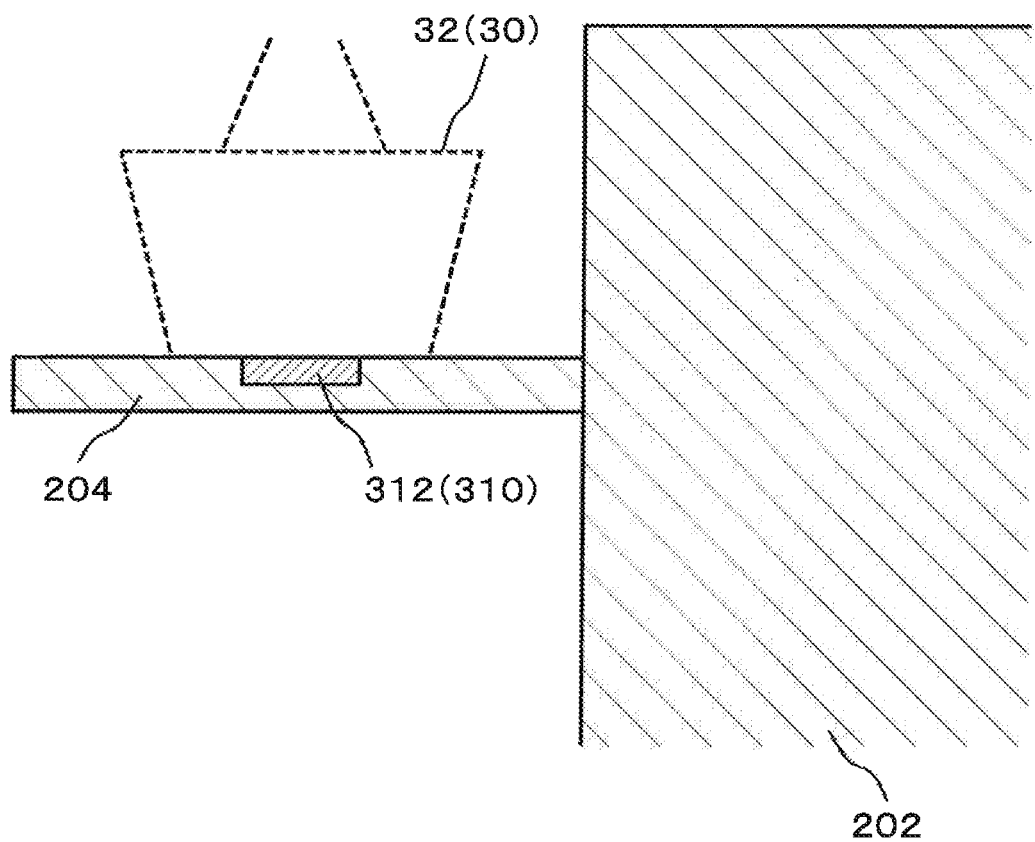
FIG. 19 is a drawing illustrating the first example of the detail of the configuration of a detection unit used for the checkout system illustrated in FIG. 14.

FIG. 19 is a drawing illustrating the first example of the detail of the configuration of the detection unit 310 used for the checkout system illustrated in FIG. 14. In the example illustrated in this drawing, the detection unit 310 is a weight sensor 312. The weight sensor 312 is provided to the mounting unit 204. The weight sensor 312 detects the weight of the shopping basket 32. Accordingly, the weight sensor 312 (detection unit 310) can detect that the target object 30 is disposed to the mounting unit 204 and detect that the target object 30 is moved from the mounting unit 204.

Figure 20:
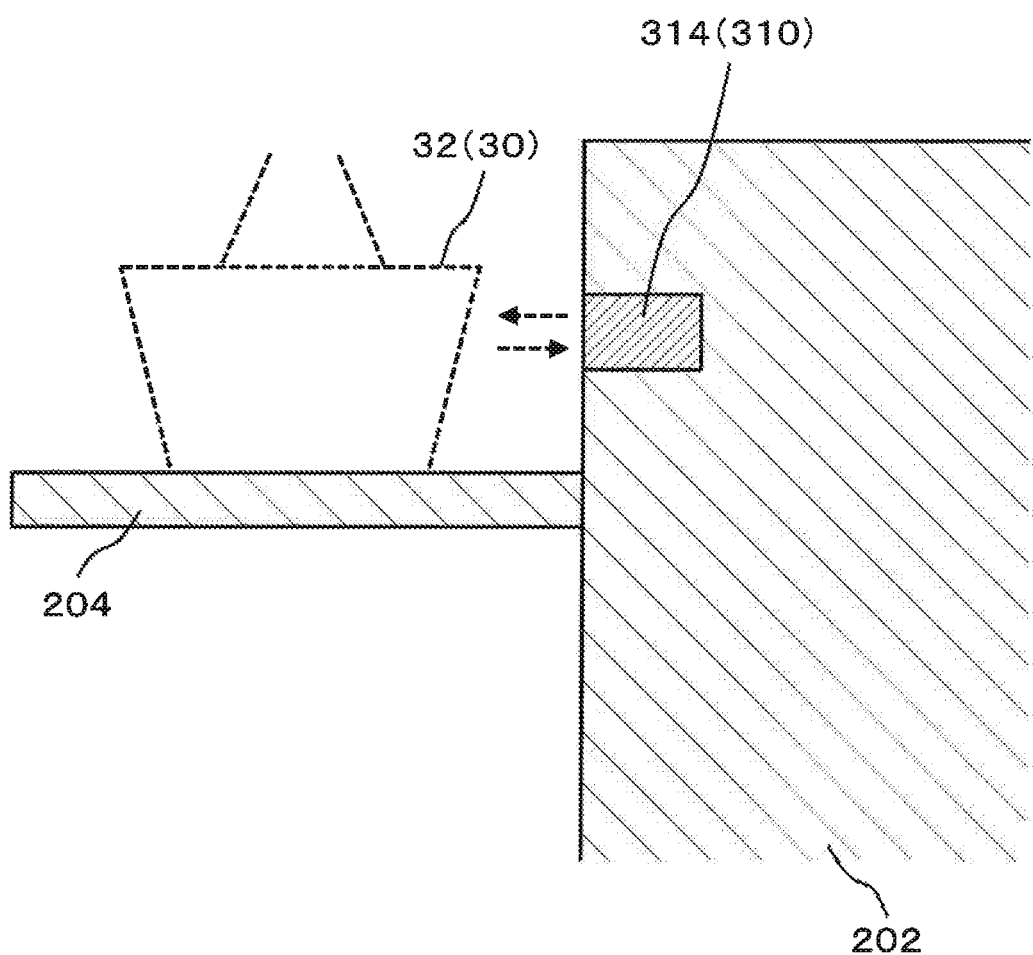
FIG. 20 is a drawing illustrating the second example of the detail of the configuration of the detection unit used for the checkout system illustrated in FIG. 14.

FIG. 20 is a drawing illustrating the second example of the detail of the configuration of the detection unit 310 used for the checkout system illustrated in FIG. 14. In the example illustrated in this drawing, the detection unit 310 is an optical sensor 314. Further, in the example illustrated in this drawing, the optical sensor 314 is provided to a side face of the base substance 202. The optical sensor 314 irradiates the target object 30 with the light (for example, visible light or infrared light).

The optical sensor 314 detects the reflected light from the target object 30. Accordingly, the optical sensor 314 (detection unit 310) can detect that the target object 30 is disposed to the mounting unit 204 and also detect that the target object 30 is moved from the mounting unit 204.

Figure 21:
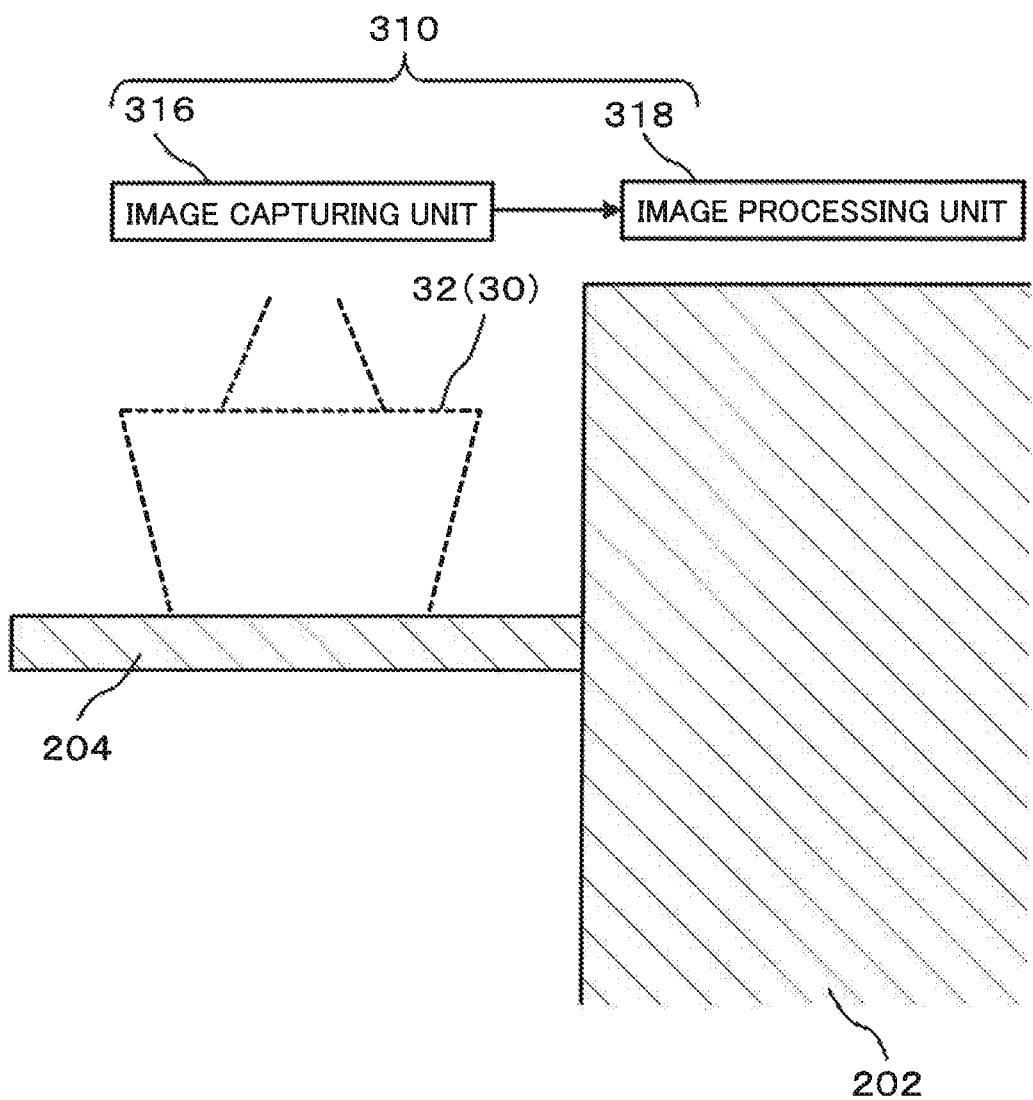
FIG. 21 is a drawing illustrating the third example of the detail of the configuration of the detection unit used for the checkout system illustrated in FIG. 14.

FIG. 21 is a drawing illustrating the third example of the detail of the configuration of the detection unit 310 used for the checkout system illustrated in FIG. 14. In the example illustrated in this drawing, the detection unit 310 includes an image capturing unit 316 and an image processing unit 318. The image capturing unit 316 captures images of the target object 30 and the circumference thereof. The image processing unit 318 processes the image data generated by the image capturing unit 316. Accordingly, the detection unit 310, based on the processed result of the image processing unit 318, can detect that the target object 30 is disposed to the mounting unit 204 and detect that the target object 30 is moved from the mounting unit 204. Note that the image processing unit 318 may be provided to the outside of the base substance 202 or may be attached to the base substance 202.

Figure 22:
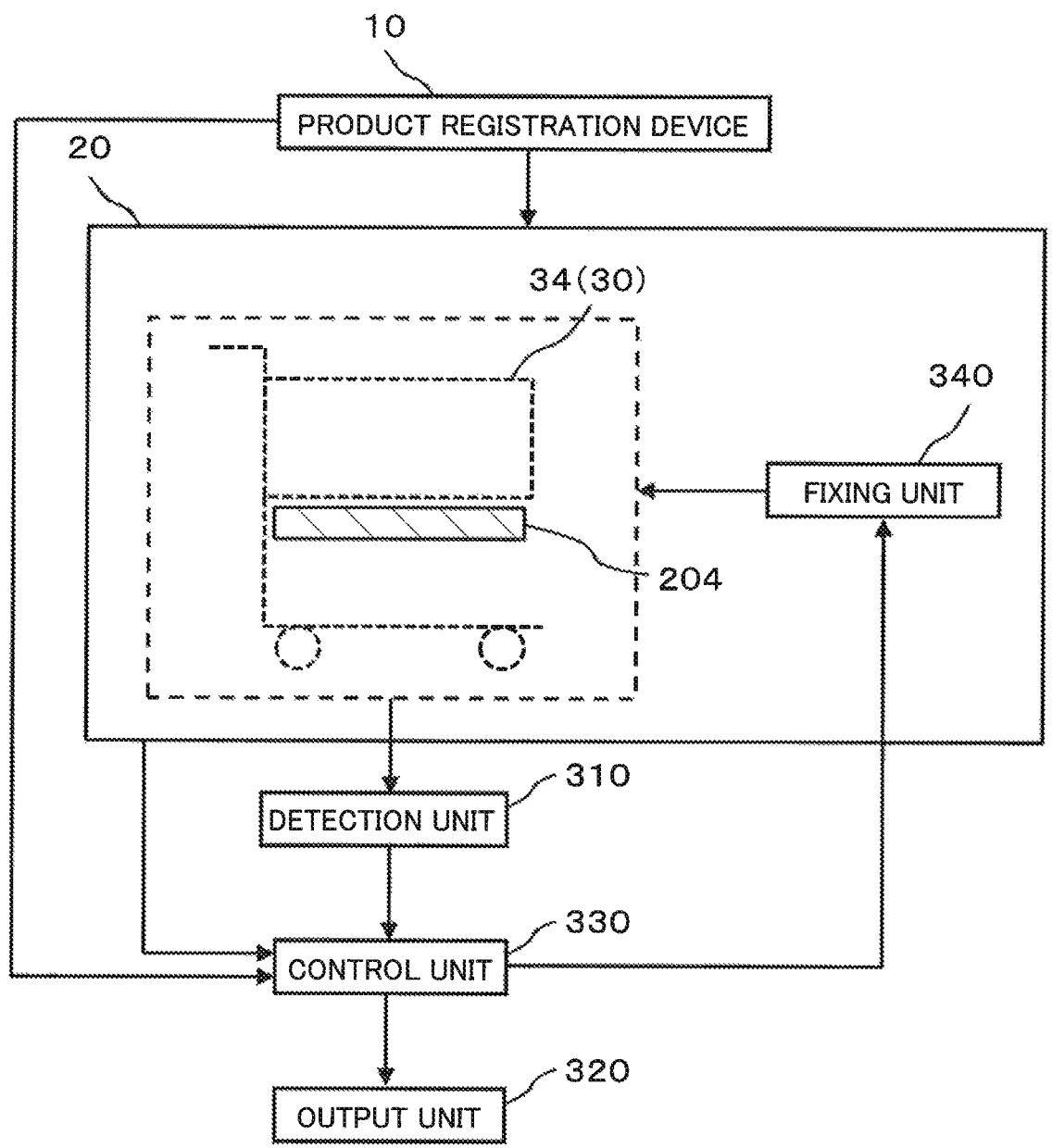
FIG. 22 is a drawing illustrating the first variation of FIG. 14.

FIG. 22 is a drawing illustrating the first variation of FIG. 14. The target object 30 may be a shopping cart 34. As illustrated in this drawing, the shopping cart 34 can be plugged to the mounting unit 204. As similar to the above described method, the detection unit 310 detects that the shopping cart 34 is plugged to the mounting unit 204 and detects that the shopping cart 34 is pulled out from the mounting unit 204. Then, the output unit 320 outputs the output if the shopping cart 34 is pulled out from the mounting unit 204 when the state of the checkout process meets the standard (for example, when the state of the checkout process is the state before the completion of the checkout process). According to the present variation, based on the presence or the absence of the movement of the target object 30 from the checkout device 20 and the state of the checkout process, the output unit 320 can output information indicating that the target object 30 moves from the checkout device 20.

Figure 23:
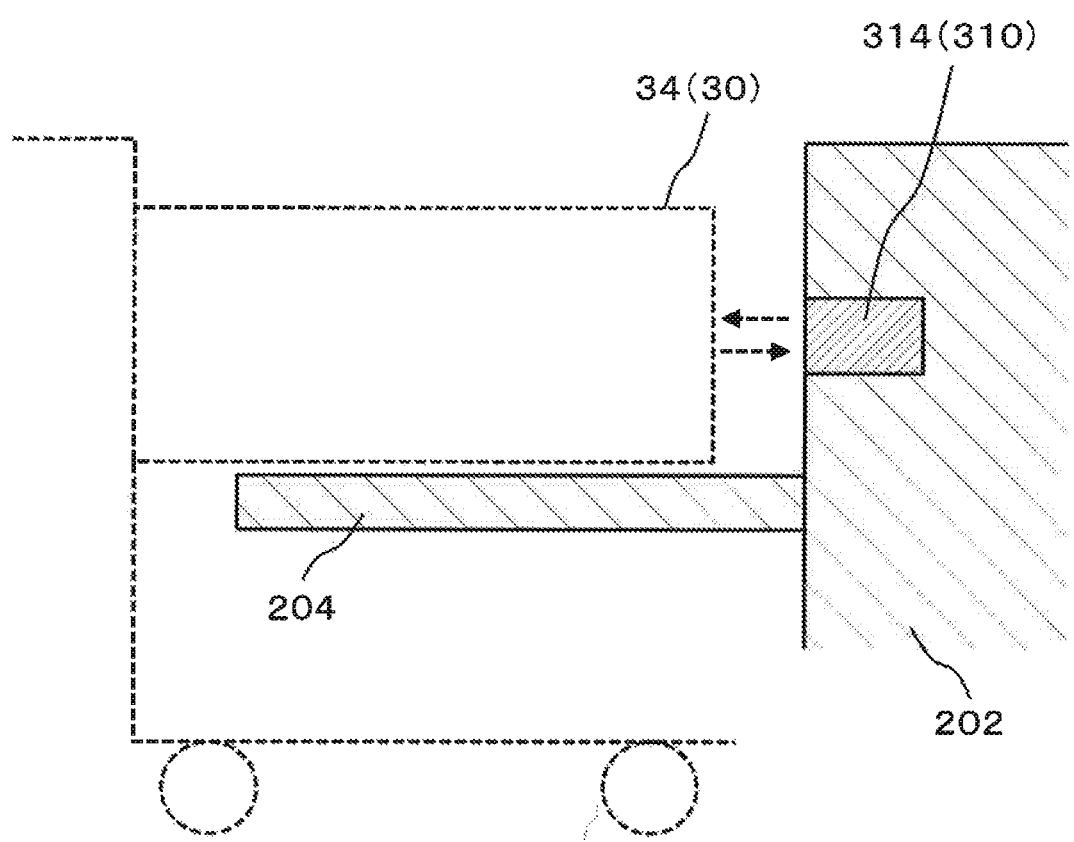
FIG. 23 is a drawing illustrating the first example of the detail of the configuration of the detection unit used for the checkout system illustrated in FIG. 22.

FIG. 23 is a drawing illustrating the first example of the detail of the configuration of the detection unit 310 used for the checkout system illustrated in FIG. 22. In the example illustrated in this drawing, the detection unit 310 is the optical sensor 314. Further, in the example illustrated in this drawing, the optical sensor 314 is provided to a side face of the base substance 202. The optical sensor 314 irradiates the target object 30 with the light (for example, visible light or infrared light).

The optical sensor 314 detects the reflected light from the target object 30. Accordingly, the optical sensor 314 (detection unit 310) can detect that the target object 30 is disposed to the mounting unit 204 and detect that the target object 30 is moved from the mounting unit 204.

FIG. 24 is a drawing illustrating the second example of the detail of the configuration of the detection unit 310 used for the checkout system illustrated in FIG. 22. In the example illustrated in this drawing, the detection unit 310 includes the image capturing unit 316 and the image processing unit 318. The image capturing unit 316 captures images of the target object 30 and the circumference thereof. The image processing unit 318 processes the image data generated by the image capturing unit 316. Accordingly, the detection unit 310, based on the processed result of the image processing unit 318, can detect that the target object 30 is disposed to the mounting unit 204 and detect that the target object 30 is moved from the mounting unit 204. Note that the image processing unit 318 may be provided to the outside of the base substance 202 or may be attached to the base substance 202.

Figure 25:
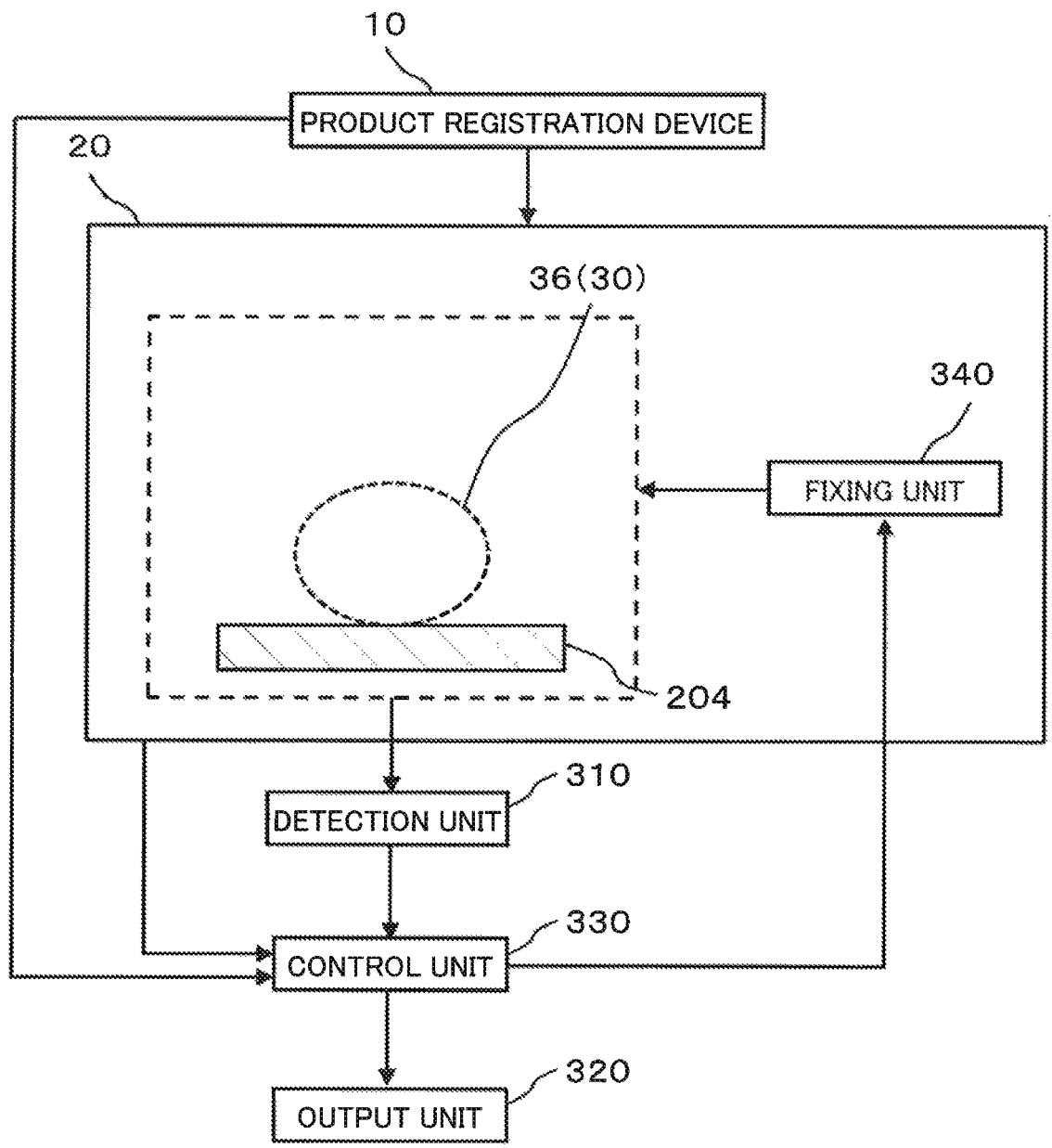
FIG. 25 is a drawing illustrating the second variation of FIG. 14.

FIG. 25 is a drawing illustrating the second variation of FIG. 14. The target object 30 may be a product 36. As illustrated in this drawing, the product 36 can be mounted to the mounting unit 204. As similar to the above described method, the detection unit 310 detects that the product 36 is mounted to the mounting unit 204 and detects that the product 36 is away from the mounting unit 204. Then, the output unit 320 outputs the output if the product 36 is away from the mounting unit 204 when the state of the checkout process meets the standard (for example, when the state of the checkout process is the state before the completion of the checkout process). According to the present variation, based on the presence or the absence of the movement of the target object 30 from the checkout device 20 and the state of the checkout process, the output unit 320 can output information indicating that the target object 30 moves from the checkout device 20.

Figure 26:
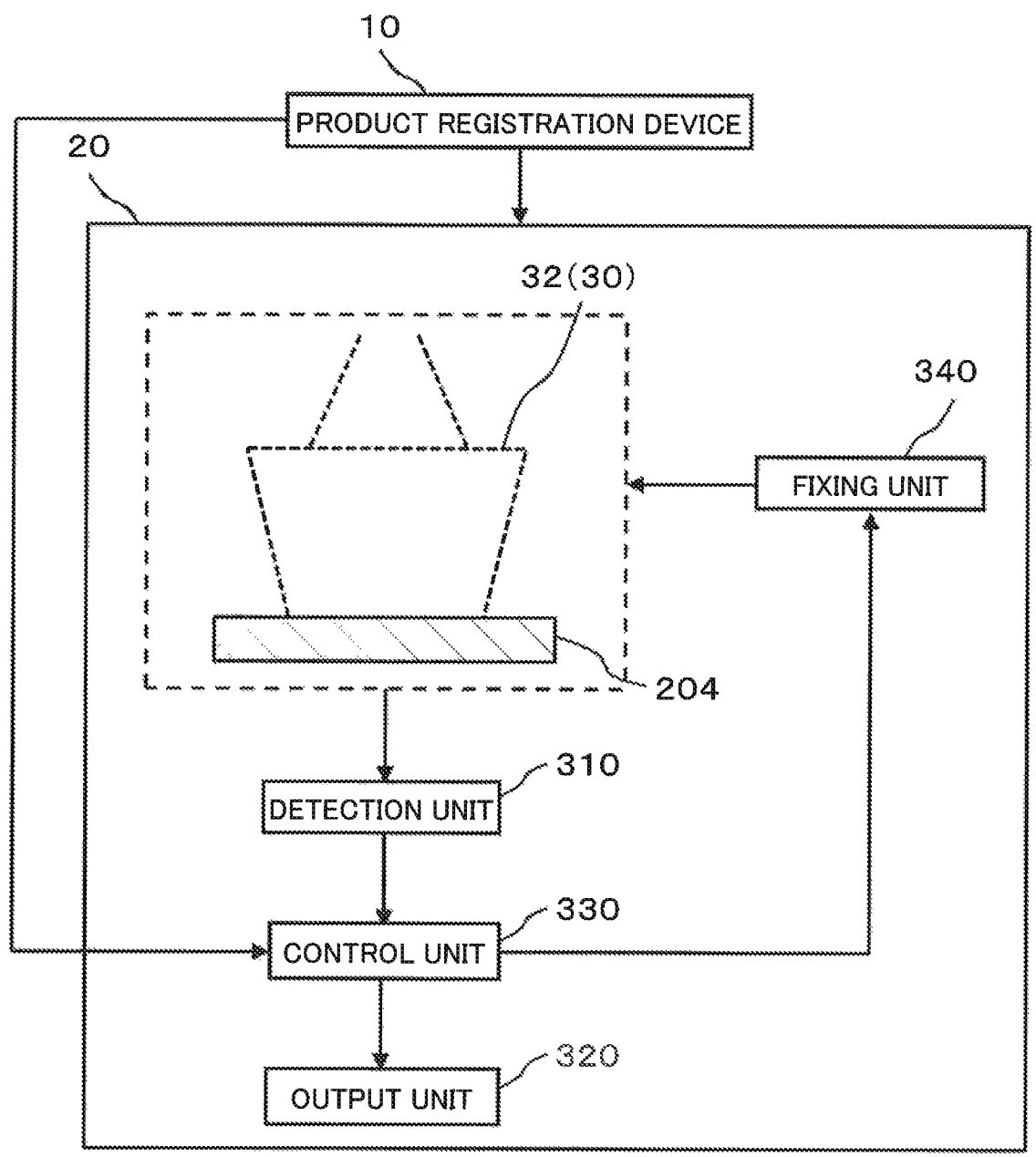
FIG. 26 is a drawing illustrating the third variation of FIG. 14.

FIG. 26 is a drawing illustrating the third variation of FIG. 14. As illustrated in this drawing, the checkout device 20 may include the detection unit 310, the output unit 320, the control unit 330, and the fixing unit 340.

According to the present variation, based on the presence or the absence of the movement of the target object 30 from the checkout device 20 and the state of the checkout process, the output unit 320 can output information indicating that the target object 30 moves from the checkout device 20.

In the present example embodiment also, effects similar to those of the first example embodiment can be achieved. Note that the target object 30 is not limited to the shopping basket 32, the shopping cart 34, and the product 36. The target object 30 may be materials other than the shopping basket 32, the shopping cart 34, and the product 36.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent applications No. 2015-195127 filed on Sep. 30, 2015, the disclosure of which is incorporated herein in its entirety by reference.

REFERENCE SIGNS LIST

10 Product registration device
20 Checkout device
20a First checkout device
20b Second checkout device
30 Target object
32 Shopping basket
34 Shopping cart
36 Product
100 Calculating machine
110 Bus
122 Processor
124 Memory
126 Storage
128 Input-output interface
130 Network interface
140 Input device
150 Reading device
170 Display device
200 Calculating machine
202 Base substance
204 Mounting unit
204a First mounting unit
204b Second mounting unit
210 Bus
222 Processor
224 Memory
226 Storage
228 Input-output interface
230 Network interface
240 Input device
260 Change device
262 Coin slot
264 Bill inserting slit
266 Coin discharge outlet
270 Display device
280 Printing device
310 Detection unit
312 Weight sensor
314 Optical sensor
316 Image capturing unit
318 Image processing unit
320 Output unit
322 Display device
324 Sound wave generating unit
326 Light source
328 Vibration generating unit
330 Control unit
340 Fixing unit

The invention claimed is:

1. A checkout system comprising:
   a product register that registers a product and generates checkout information for the products that are registered;
   a checkout computer that conducts a checkout process of a product registered through the product register;
   a sensor configured to detect that a target object moves away from the checkout computer, the target object being any one of the product, a shopping basket in which the product is accommodated, and a shopping cart in which the product is accommodated; and
   an output terminal comprising a processor configured to:
      determine whether or not the checkout process is completed by the checkout computer;
      determine whether the target object moves away from the checkout computer before the checkout process is completed; and
      output information indicating that the target object moves away from the checkout computer based on a determination that the target object moves away from the checkout computer before the checkout process is completed.

2. The checkout system according to claim 1, wherein
   at least one of the product register and the checkout computer can output a non-operation signal, i.e., a signal for not causing the output terminal to output the information; and
   the output terminal does not output the information when the non-operation signal is input during a period from a start of the checkout process to a completion of the checkout process.

3. The checkout system according to claim 1, wherein the output terminal does not output the information before the start of the checkout process.

4. The checkout system according to claim 1, wherein the output terminal does not output the information during a period from the completion of the checkout process to a start of a next checkout process.

5. The checkout system according to claim 1, wherein
   the product register, based on a registration result of the product, generates the checkout information and inputs the checkout information to the checkout computer; and
   when after the checkout information is input, the target object is disposed to the checkout computer, the checkout computer starts the checkout process.

6. The checkout system according to claim 4, further comprising:
   a fixing equipment for fixing the target object to the checkout computer during a period from a start of the checkout process to an end of the checkout process.

7. The checkout system according to claim 1, further comprising:
   a controller for controlling the output terminal; wherein
   the controller, based on a detection result of the sensor, determines whether the target object moves away from the checkout computer before the completion of the checkout process, and when determining that the target object moves away from the checkout computer before the completion of the checkout process, causes the output terminal to output the information.

8. The checkout system according to claim 1, wherein the sensor comprises a weight sensor that detects a weight of the target object.

9. The checkout system according to claim 1, wherein the sensor comprises an optical sensor that detects reflected light from the target object.

10. The checkout system according to claim 1, wherein the sensor comprises:
    an image capturer for capturing an image of the target object and a circumference thereof; and
    an image processor for processing image data generated by the image capturer.

11. The checkout system according to claim 1, further comprising:
    a display that is provided to either one of the product register and the checkout computer; wherein
    when receiving the information from the output terminal, the display displays information indicating that the target object moves away from the checkout computer.

12. The checkout system according to claim 1, further comprising:
    a sound wave generator that is provided to at least one of positions that are distant from the product register, the checkout computer, and both the product register and the checkout computer; wherein
    when receiving the information from the output terminal, the sound wave generator causes a sound wave to be generated.

13. The checkout system according to claim 1, further comprising:
    a light source that is provided to at least one of positions that are distant from the product register, the checkout computer, and both the product register and the checkout computer, wherein
    when receiving the information from the output terminal, the light source causes light to be generated.

14. The checkout system according to claim 1, further comprising:
    a vibration generator held by a sales assistant of a store in which the product register and the checkout computer are used; wherein
    when receiving the information from the output terminal, the vibration generator causes a vibration to be generated.

15. A checkout computer comprising:
    a checkout processor for conducting a checkout process of a product that is registered through a product register; and
    an output terminal comprising a computer configured to:
       determine whether or not the checkout process is completed by a checkout computer;
       determine whether a target object moves away from the checkout computer before the checkout process is completed, the target object being any one of the product, a shopping basket in which the product is accommodated, and a shopping cart in which the product is accommodated; and
    output information indicating that the target object moves away from the checkout computer based on a determination that the target object moves away from the checkout computer before the checkout process is completed.

16. A checkout method comprising:
    conducting a checkout process of a product that is registered through a product register;
    detecting that a target object moves away from a checkout computer, the target object being any one of the product, a shopping basket in which the product is accommodated, and a shopping cart in which the product is accommodated;

determining whether or not the checkout process is completed by the checkout computer;
determining whether the target object moves away from the checkout computer before the checkout process is completed; and
outputting information indicating that the target object moves from a checkout computer based on a determination that the target object moves away from the checkout computer before the checkout process is completed.

* * * * *